(12) United States Patent
Yu et al.

(10) Patent No.: US 10,581,578 B2
(45) Date of Patent: Mar. 3, 2020

(54) FEEDBACK INFORMATION TRANSMISSION METHOD, BASE STATION, AND USER EQUIPMENT

(71) Applicant: Huawei Technologies Co., Ltd., Shenzhen (CN)

(72) Inventors: Zheng Yu, Beijing (CN); Yi Wang, Shanghai (CN); Xiangdong Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 15/934,026

(22) Filed: Mar. 23, 2018

(65) Prior Publication Data

US 2018/0219665 A1 Aug. 2, 2018

Related U.S. Application Data

(63) Continuation of application No. PCT/CN2015/090784, filed on Sep. 25, 2015.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS

2012/0320760 A1 12/2012 Kim et al.
2015/0263829 A1 9/2015 Nguyen et al.
(Continued)

FOREIGN PATENT DOCUMENTS

| CN | 102149131 A | 8/2011 |
| CN | 104780549 A | 7/2015 |
| WO | 2015114459 A1 | 8/2015 |

OTHER PUBLICATIONS

Nokia Networks, "HARQ ACK/NACK for PUSCH," 3GPP TSG-RAN WG1 Meeting #82, R1-153831, Beijing, China, Aug. 24-28, 2015, 2 pages.
(Continued)

*Primary Examiner* — Kodzovi Acolatse
(74) *Attorney, Agent, or Firm* — Slater Matsil, LLP

(57) ABSTRACT

A feedback information transmission method, a base station, and user equipment are provided. The feedback information transmission method includes: receiving, by a base station, uplink data separately sent by a plurality of user equipments (UEs); determining, by the base station, feedback information for uplink data sent by each of the plurality of UEs, where the feedback information indicates an acknowledgement (ACK) or a negative acknowledgement (NACK); and transmitting, by the base station by using one control channel, a plurality of pieces of feedback information respectively corresponding to the uplink data sent by the plurality of UEs.

14 Claims, 4 Drawing Sheets

(51) Int. Cl.
*H04W 4/70* (2018.01)
*H04W 28/04* (2009.01)
*H04W 72/12* (2009.01)

(52) U.S. Cl.
CPC ............ *H04L 1/1858* (2013.01); *H04W 4/70* (2018.02); *H04W 28/04* (2013.01); *H04W 72/121* (2013.01); *H04W 72/1273* (2013.01)

(56) References Cited

U.S. PATENT DOCUMENTS

| | | |
|---|---|---|
| 2016/0219587 A1* | 7/2016 | Lin .................... H04W 4/70 |
| 2016/0338110 A1 | 11/2016 | Wang et al. |
| 2018/0102890 A1* | 4/2018 | Yi .................... H04L 5/0037 |
| 2018/0160361 A1* | 6/2018 | Yi .................... H04W 72/042 |
| 2018/0167169 A1* | 6/2018 | Takeda .............. H04W 28/04 |
| 2018/0212736 A1* | 7/2018 | Chatterjee ........... H04L 5/0048 |
| 2019/0288821 A1* | 9/2019 | Yi .................... H04W 72/044 |

OTHER PUBLICATIONS

LG Electronics, "Details on DCI contents for MTC," 3GPP TSG RAN WG1 Meeting #82, R1-154234, Beijing, China, Aug. 24-28, 2015, 6 pages.

KT Corp., "Views on HARQ ACK/NACK feedback for PUSCH", 3GPP TSG RAN WG1 Meeting #82, R1-154704, Beijing, China, Aug. 24-28, 2015, 2 pages.

* cited by examiner

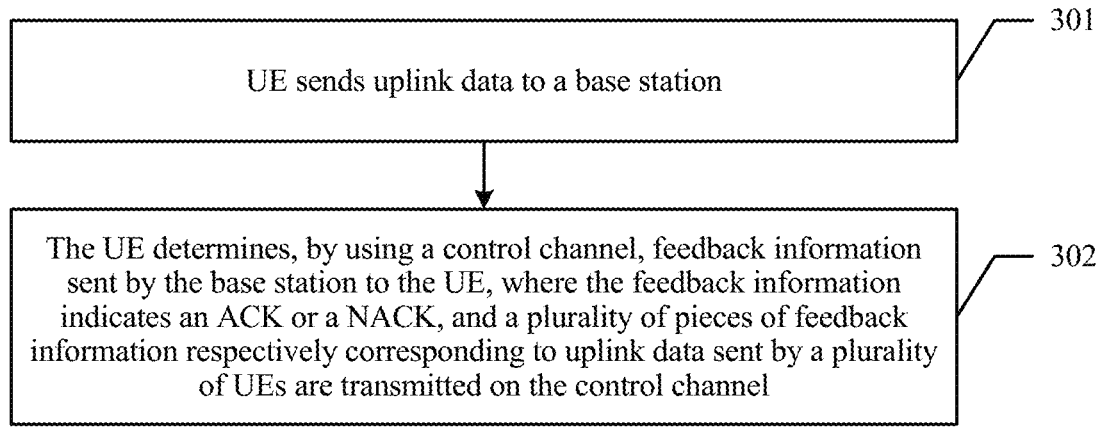
FIG. 3
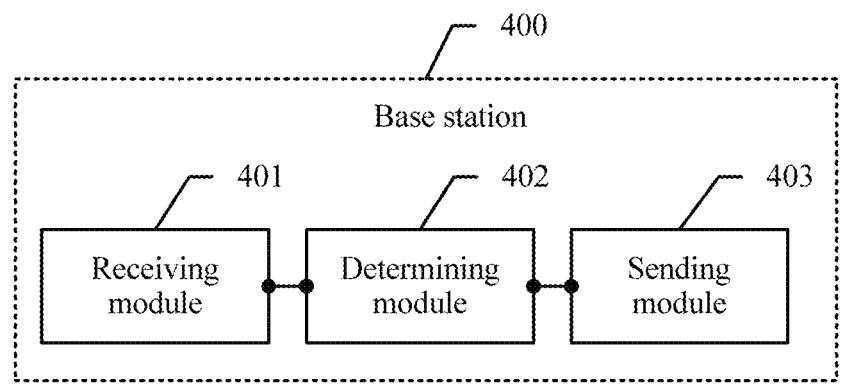
FIG. 4-a
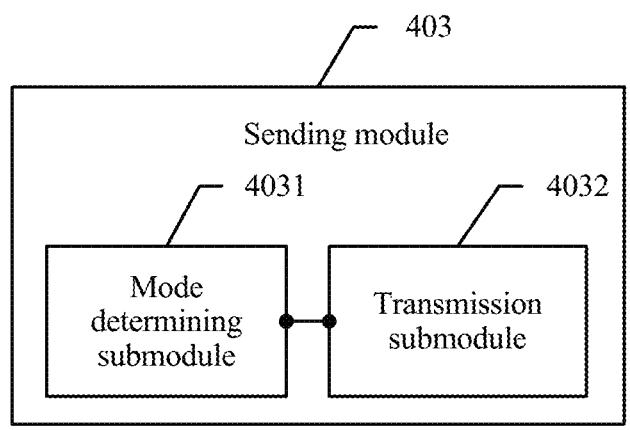
FIG. 4-b

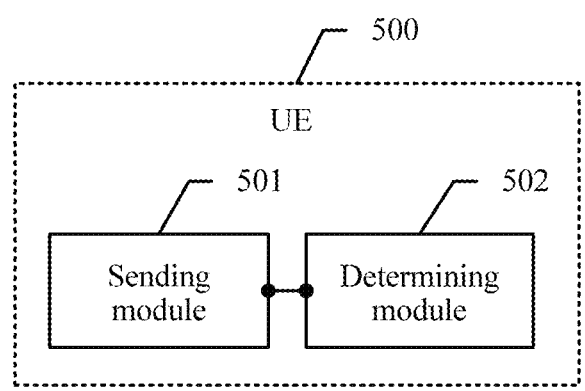
FIG. 5-a
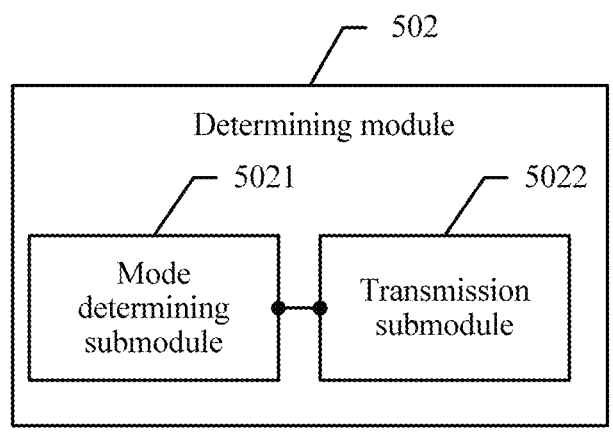
FIG. 5-b

FEEDBACK INFORMATION TRANSMISSION METHOD, BASE STATION, AND USER EQUIPMENT

CROSS-REFERENCE TO RELATED APPLICATIONS

This application is a continuation of International Patent Application No. PCT/CN2015/090784, filed on Sep. 25, 2015, the disclosure of which is hereby incorporated by reference in its entirety.

TECHNICAL FIELD

Embodiments of the present disclosure relate to the communications field, and in particular, to a feedback information transmission method, a base station, and user equipment.

BACKGROUND

The Internet of Things is a network in which various devices having specific capabilities of sensing, computation, execution, and communication are deployed to obtain information from a physical world, to implement information transmission, coordination, and processing by using a network, so as to implement interconnection between humans and things and between things and things. In brief, the Internet of Things intends to implement interconnection and interworking between humans and things and between things and things. The Internet of Things may be applied to various fields such as a smart grid, intelligent agriculture, intelligent transportation, and environmental monitoring.

The mobile communications standards organization $3^{rd}$ Generation Partnership Project (3GPP) is performing technology research and standard optimization for a service in the Internet of Things. The 3rd Generation Partnership Project mainly aims at cost reduction and coverage enhancement in terms of research and optimization. For cost reduction, an important research direction may be to reduce an operating bandwidth of a terminal device, for example, limit the operating bandwidth of the terminal device to 1.4 MHz (or 200 KHz, or 180 KHz). For coverage enhancement, coverage enhancement support is mainly provided for a machine type communication (MTC) device in a basement, or the like, that has a relatively large path loss, so that the device in the special scenario can access a network to obtain a service. Coverage enhancement intends to provide coverage enhancement support for user equipment in a basement or on a cell edge and with a relatively large path loss, so that the user equipment in the scenario can access a network to obtain a service. Coverage enhancement may be one or more of repeated transmission, spread spectrum transmission, retransmission, time interval bundling transmission, narrowband (such as subcarrier scheduling) transmission, ultra-narrowband (such as a narrowband with a bandwidth of tens of hertz to ten-odd kilohertz) transmission, power spectrum density boosting transmission, relaxed-requirement transmission, or continuous-attempt transmission. Signal repetition is one of methods for implementing coverage enhancement. In coverage enhancement, coverage can be extended to some extent, but more system resources may be consumed. Therefore, it is necessary to improve resource usage when coverage enhancement is implemented by means of signal repetition.

A base station sends a physical downlink control channel (PDCCH) to user equipment (UE). The UE sends a physical uplink shared channel (PUSCH) to the base station according to the PDCCH. The base station receives the PUSCH sent by the UE. Then, the base station sends a hybrid automatic repeat request (HARQ) feedback to the UE according to a PUSCH receiving status. For example, the HARQ feedback may be a state of acknowledgement (ACK) or negative acknowledgement (NACK). For a HARQ feedback currently implemented on a base station side, the base station transmits the HARQ feedback by using a Physical Hybrid ARQ Indicator Channel (PHICH), a PDCCH, or an enhanced physical downlink control channel (EPDCCH).

However, for MTC UE in a coverage enhancement scenario, the MTC UE has a limited bandwidth capacity, and therefore the MTC UE cannot receive a PHICH and a PDCCH. Consequently, the PHICH and the PDCCH cannot be used in an ACK feedback or a NACK feedback for a PUSCH. If the base station adds the ACK/NACK feedback to an EPDCCH, the ACK/NACK feedback needs to be indicated by using one bit in downlink control information (DCI). However, system resource overheads are relatively high when the base station sends an ACK feedback or a NACK feedback for only one UE by using one EPDCCH, especially in the coverage enhancement scenario in which the DCI needs to be repeatedly used, resulting in extremely low system resource usage.

SUMMARY

Embodiments of the present disclosure provide a feedback information transmission method, a base station, and user equipment, so as to improve resource usage.

According to a first aspect, an embodiment of the present disclosure provides a feedback information transmission method. The method includes receiving, by a base station, uplink data separately sent by a plurality of user equipments (UEs). The method also includes determining, by the base station, feedback information for uplink data sent by each of the plurality of UEs, where the feedback information indicates an acknowledgement (ACK) or a negative acknowledgement (NACK). The method also includes transmitting, by the base station by using one control channel, a set of feedback information corresponding to the uplink data sent by the plurality of UEs.

With reference to the first aspect, in a first possible implementation of the first aspect, the transmitting, by the base station by using one control channel, a set of feedback information corresponding to the uplink data sent by the plurality of UEs includes: determining, by the base station, a mode of each UE, where the mode of each UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status; and when determining that the mode of the UE is a first mode, transmitting, by the base station, the feedback information by using a first downlink control information format; or when determining that the mode of the UE is a second mode, transmitting, by the base station, the feedback information by using a second downlink control information format, where the first mode is different from the second mode, and the first downlink control information format is different from the second downlink control information format.

With reference to the first possible implementation of the first aspect, in a second possible implementation of the first aspect, that the first downlink control information format is different from the second downlink control information format includes: the first downlink control information format includes a downlink control information format of the feedback information used to feed back one or more uplink data of one UE; and the second downlink control information format includes a downlink control information format of the feedback information used to simultaneously feed back uplink data of a plurality of UEs.

With reference to the first possible implementation of the first aspect, in a third possible implementation of the first aspect, the determining, by the base station, a mode of each UE includes: determining, by the base station, the mode of the UE according to coverage enhancement information of the UE; or autonomously determining, by the base station, the mode of the UE, and notifying the UE of the determined mode of the UE by using signaling.

With reference to the first aspect, or the first, the second, or the third possible implementation of the first aspect, in a fourth possible implementation of the first aspect, a quantity of feedback information included in the control channel is determined in the following manner: configuring, by using radio resource control signaling or media access control signaling, the quantity of feedback information included in the control channel; or indicating, by using a field in downlink control information transmitted on the control channel, the quantity of feedback information included in the control channel; or determining, by means of predetermination, the quantity of feedback information included in downlink control information transmitted on the control channel.

With reference to the first aspect, or the first, the second, the third, or the fourth possible implementation of the first aspect, in a fifth possible implementation of the first aspect, the downlink control information of the control channel includes M bits, the quantity of feedback information is N, each feedback information of the set of feedback information is indicated by using one bit, each feedback information of the set of feedback information is repeatedly transmitted floor(M/N) times in the downlink control information, floor indicates rounding down to the nearest integer, and both M and N are positive integers.

With reference to the first aspect, or the first, the second, the third, or the fourth possible implementation of the first aspect, in a sixth possible implementation of the first aspect, any one of the plurality of UEs is first UE, and a location that is of feedback information sent by the base station to the first UE and that is in the downlink control information carried on the control channel is determined in the following manner: determining, by the base station according to at least one piece of the following information, the location that is of the feedback information sent to the first UE and that is in the downlink control information, where the following information includes an identifier of the first UE, information about resources used by the first UE to send uplink data, a transmission parameter of the control channel, or the quantity of feedback information carried on the control channel; or determining, by the base station according to a sequence index that is of a media access control random access response MAC RAR sent to the first UE and that is in an RAR message, the location that is of the feedback information of the first UE and that is in the downlink control information; or autonomously determining, by the base station, the location that is of the feedback information of the first UE and that is in the downlink control information, and adding, to an RAR message sent to the first UE, the location that is of the feedback information of the first UE and that is in the downlink control information.

With reference to the sixth possible implementation of the first aspect, in a seventh possible implementation of the first aspect, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process.

With reference to the first aspect, or the first, the second, the third, the fourth, the fifth, the sixth, or the seventh possible implementation of the first aspect, in an eighth possible implementation of the first aspect, narrowband resources used for performing transmission by using the control channel are determined in the following manner: adding, by the base station, indication information of the narrowband resources to a random access response RAR message sent to UE; or determining, by the base station by means of preconfiguration according to an identifier of UE or an identifier of a group in which UE is located, the narrowband resources used for performing transmission by using the control channel.

With reference to the first aspect, or the first, the second, the third, the fourth, the fifth, the sixth, the seventh, or the eighth possible implementation of the first aspect, in a ninth possible implementation of the first aspect, a time interval between a time at which one UE sends uplink data and a time at which the UE receives a same control channel is different from that in the case of another UE.

According to a second aspect, an embodiment of the present disclosure further provides another feedback information transmission method. The method includes sending, by user equipment (UE), uplink data to a base station. The method also includes determining, by the UE by using a control channel, feedback information sent by the base station to the UE, where the feedback information indicates an acknowledgement (ACK) or a negative acknowledgement (NACK), and a set of feedback information corresponding to uplink data sent by a plurality of UEs are transmitted on the control channel.

With reference to the second aspect, in a first possible implementation of the second aspect, the obtaining, by the UE by using a control channel, feedback information sent by the base station to the UE includes: determining, by the UE, a mode of the UE, where the mode of the UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status; and when determining that the mode of the UE is a first mode, receiving, by the UE by using a first downlink control information format, the feedback information sent by the base station; or when determining that the mode of the UE is a second mode, receiving, by the UE by using a second downlink control information format, the feedback information sent by the base station, where the first mode is different from the second mode, and the first downlink control information format is different from the second downlink control information format.

With reference to the first possible implementation of the second aspect, in a second possible implementation of the second aspect, that the first downlink control information format is different from the second downlink control information format includes: the first downlink control information format includes a downlink control information format of the feedback information used to feed back one or more uplink data of one UE; and the second downlink control information format includes a downlink control information format of the feedback information used to simultaneously feed back uplink data of a plurality of UEs.

With reference to the first possible implementation of the second aspect, in a third possible implementation of the second aspect, the determining, by the UE, a mode of the UE includes: determining, by the UE, the mode of the UE according to coverage enhancement information of the UE; or determining, by the UE, the mode of the UE by receiving signaling sent by the base station.

With reference to the second aspect, or the first, the second, or the third possible implementation of the second aspect, in a fourth possible implementation of the second aspect, a quantity of feedback information included in the control channel is determined in the following manner: receiving radio resource control signaling or media access control signaling, where the radio resource control signaling or the media access control signaling is used to configure the quantity of feedback information included in the control channel; or receiving downlink control information transmitted on the control channel, where a field in the downlink control information is used to indicate the quantity of feedback information included in the control channel; or determining, by means of predetermination, the quantity of feedback information included in downlink control information transmitted on the control channel.

With reference to the second aspect, or the first, the second, the third, or the fourth possible implementation of the second aspect, in a fifth possible implementation of the second aspect, the downlink control information of the control channel includes M bits, the quantity of feedback information is N, each feedback information of the set of feedback information is indicated by using one bit, each feedback information of the set of feedback information is repeatedly transmitted floor(M/N) times in the downlink control information, floor indicates rounding down to the nearest integer, and both M and N are positive integers.

With reference to the second aspect, or the first, the second, the third, or the fourth possible implementation of the second aspect, in a sixth possible implementation of the second aspect, the UE determines, in the following manner, a location that is of the feedback information and that is in the downlink control information carried on the control channel: determining, by the UE according to at least one piece of the following information, the location that is of the feedback information and that is in the downlink control information, where the following information includes an identifier of the UE, information about resources used by the UE to send uplink data, a transmission parameter of the control channel, or the quantity of feedback information carried on the control channel; or determining, by the UE according to a sequence index that is of a media access control random access response MAC RAR sent by the base station to the UE and that is in an RAR message, the location that is of the feedback information and that is in the downlink control information; or receiving, by the UE, an RAR message sent by the base station to the UE, and obtaining, from the received RAR message, the location that is of the feedback information and that is in the downlink control information.

With reference to the sixth possible implementation of the second aspect, in a seventh possible implementation of the second aspect, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process.

With reference to the second aspect, or the first, the second, the third, the fourth, the fifth, the sixth, or the seventh possible implementation of the second aspect, in an eighth possible implementation of the second aspect, narrowband resources used for performing transmission by using the control channel are determined in the following manner: determining, by the UE, the narrowband resources by using indication information that is of the narrowband resources and that is carried in the RAR message sent by the base station to the UE; or determining, by the UE by means of preconfiguration according to the identifier of the UE or an identifier of a group in which the UE is located, the narrowband resources used for performing transmission by using the control channel.

With reference to the second aspect, or the first, the second, the third, the fourth, the fifth, the sixth, the seventh, or the eighth possible implementation of the second aspect, in a ninth possible implementation of the second aspect, a time interval between a time at which one UE sends uplink data and a time at which the UE receives a same control channel is different from that in the case of another UE.

According to a third aspect, an embodiment of the present disclosure further provides a base station. The base station includes a receiving module, configured to receive uplink data separately sent by a plurality of user equipments (UEs). The base station also includes a determining module, configured to determine feedback information for uplink data sent by each of the plurality of UEs, where the feedback information indicates an acknowledgement (ACK) or a negative acknowledgement (NACK). The base station also includes a sending module, configured to transmit, by using one control channel, a set of feedback information corresponding to the uplink data sent by the plurality of UEs.

With reference to the third aspect, in a first possible implementation of the third aspect, the sending module includes a mode determining submodule and a transmission submodule, where the mode determining submodule is configured to determine a mode of each UE, where the mode of each UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status; and the transmission submodule is configured to: when it is determined that the mode of the UE is a first mode, transmit the feedback information by using a first downlink control information format; or when it is determined that the mode of the UE is a second mode, transmit the feedback information by using a second downlink control information format, where the first mode is different from the second mode, and the first downlink control information format is different from the second downlink control information format.

With reference to the first possible implementation of the third aspect, in a second possible implementation of the third aspect, that the first downlink control information format is different from the second downlink control information format includes: the first downlink control information format includes a downlink control information format of the feedback information used to feed back one or more uplink data of one UE; and the second downlink control information format includes a downlink control information format of the feedback information used to simultaneously feed back uplink data of a plurality of UEs.

With reference to the first possible implementation of the third aspect, in a third possible implementation of the third aspect, the determining submodule is specifically configured to: determine the mode of the UE according to coverage enhancement information of the UE; or autonomously determine the mode of the UE, and notify the UE of the determined mode of the UE by using signaling.

With reference to the third aspect, or the first, the second, or the third possible implementation of the third aspect, in a fourth possible implementation of the third aspect, the determining module is further configured to determine, in the following manner, a quantity of feedback information included in the control channel; configuring, by using radio resource control signaling or media access control signaling, the quantity of feedback information included in the control channel; or indicating, by using a field in downlink control information transmitted on the control channel, the quantity of feedback information included in the control channel; or determining, by means of predetermination, the quantity of feedback information included in downlink control information transmitted on the control channel.

With reference to the third aspect, or the first, the second, the third, or the fourth possible implementation of the third aspect, in a fifth possible implementation of the third aspect, the downlink control information of the control channel includes M bits, the quantity of feedback information is N, each feedback information of the set of feedback information is indicated by using one bit, each feedback information of the set of feedback information is repeatedly transmitted floor(M/N) times in the downlink control information, floor indicates rounding down to the nearest integer, and both M and N are positive integers.

With reference to the third aspect, or the first, the second, the third, or the fourth possible implementation of the third aspect, in a sixth possible implementation of the third aspect, any one of the plurality of UEs is first UE, and the determining module is further configured to determine, in the following manner, a location that is of feedback information sent to the first UE and that is in the downlink control information carried on the control channel: determining, according to at least one piece of the following information, the location that is of the feedback information sent to the first UE and that is in the downlink control information, where the following information includes an identifier of the first UE, information about resources used by the first UE to send uplink data, a transmission parameter of the control channel, or the quantity of feedback information carried on the control channel; or determining, according to a sequence index that is of a media access control random access response MAC RAR sent to the first UE and that is in an RAR message, the location that is of the feedback information of the first UE and that is in the downlink control information; or autonomously determining the location that is of the feedback information of the first UE and that is in the downlink control information, and adding, to an RAR message sent to the first UE, the location that is of the feedback information of the first UE and that is in the downlink control information.

With reference to the sixth possible implementation of the third aspect, in a seventh possible implementation of the third aspect, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process.

With reference to the third aspect, or the first, the second, the third, the fourth, the fifth, the sixth, or the seventh possible implementation of the third aspect, in an eighth possible implementation of the third aspect, the determining module is further configured to determine, in the following manner, narrowband resources used for performing transmission by using the control channel: adding indication information of the narrowband resources to a random access response RAR message sent to UE; or determining, by means of preconfiguration according to an identifier of UE or an identifier of a group in which UE is located, the narrowband resources used for performing transmission by using the control channel.

With reference to the third aspect, or the first, the second, the third, the fourth, the fifth, the sixth, the seventh, or the eighth possible implementation of the third aspect, in a ninth possible implementation of the third aspect, a time interval between a time at which one UE sends uplink data and a time at which the UE receives a same control channel is different from that in the case of another UE.

According to a fourth aspect, an embodiment of the present disclosure further provides user equipment. The user equipment includes a sending module, configured to send uplink data to a base station. The user equipment also includes a determining module, configured to determine, by using a control channel, feedback information sent by the base station to the UE, where the feedback information indicates an acknowledgement (ACK) or a negative acknowledgement (NACK), and a set of feedback information corresponding to uplink data sent by a plurality of UEs are transmitted on the control channel.

With reference to the fourth aspect, in a first possible implementation of the fourth aspect, the determining module includes a mode determining submodule and a transmission submodule, where the mode determining submodule is configured to determine a mode of the UE, where the mode of the UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status; and the transmission submodule is configured to: when it is determined that the mode of the UE is a first mode, receive, by using a first downlink control information format, the feedback information sent by the base station; or when it is determined that the mode of the UE is a second mode, receive, by using a second downlink control information format, the feedback information sent by the base station, where the first mode is different from the second mode, and the first downlink control information format is different from the second downlink control information format.

With reference to the first possible implementation of the fourth aspect, in a second possible implementation of the fourth aspect, that the first downlink control information format is different from the second downlink control information format includes: the first downlink control information format includes a downlink control information format of the feedback information used to feed back one or more uplink data of one UE; and the second downlink control information format includes a downlink control information format of the feedback information used to simultaneously feed back uplink data of a plurality of UEs.

With reference to the first possible implementation of the fourth aspect, in a third possible implementation of the fourth aspect, the mode determining submodule is specifically configured to: determine the mode of the UE according to coverage enhancement information of the UE; or determine the mode of the UE by receiving signaling sent by the base station.

With reference to the fourth aspect, or the first, the second, or the third possible implementation of the fourth aspect, in a fourth possible implementation of the fourth aspect, the determining module is further configured to determine, in the following manner, a quantity of feedback information included in the control channel: receiving radio resource control signaling or media access control signaling, where the downlink control information is used to configure the quantity of feedback information included in the control channel; or receiving downlink control information transmitted on the control channel, where a field in the downlink control information is used to indicate the quantity of feedback information included in the control channel; or determining, by means of predetermination, the quantity of feedback information included in downlink control information transmitted on the control channel.

With reference to the fourth aspect, or the first, the second, the third, or the fourth possible implementation of the fourth aspect, in a fifth possible implementation of the fourth aspect, the downlink control information of the control channel includes M bits, the quantity of feedback information is N, each feedback information of the set of feedback information is indicated by using one bit, each feedback information of the set of feedback information is repeatedly transmitted floor(M/N) times in the downlink control information, floor indicates rounding down to the nearest integer, and both M and N are positive integers.

With reference to the fourth aspect, or the first, the second, the third, or the fourth possible implementation of the fourth aspect, in a sixth possible implementation of the fourth aspect, the determining module is further configured to determine, in the following manner, a location that is of the feedback information and that is in the downlink control information carried on the control channel: determining, according to at least one piece of the following information, the location that is of the feedback information and that is in the downlink control information, where the following information includes an identifier of the UE, information about resources used by the UE to send uplink data, a transmission parameter of the control channel, or the quantity of feedback information carried on the control channel; or determining, according to a sequence index that is of a media access control random access response MAC RAR sent by the base station to the UE and that is in an RAR message, the location that is of the feedback information and that is in the downlink control information; or receiving an RAR message sent by the base station to the UE, and obtaining, from the received RAR message, the location that is of the feedback information and that is in the downlink control information.

With reference to the sixth possible implementation of the fourth aspect, in a seventh possible implementation of the fourth aspect, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process.

With reference to the fourth aspect, or the first, the second, the third, the fourth, the fifth, the sixth, or the seventh possible implementation of the fourth aspect, in an eighth possible implementation of the fourth aspect, the determining module is further configured to determine, in the following manner, narrowband resources used for performing transmission by using the control channel: determining the narrowband resources by using indication information that is of the narrowband resources and that is carried in the RAR message sent by the base station to the UE; or determining, by means of preconfiguration according to the identifier of the UE or an identifier of a group in which the UE is located, the narrowband resources used for performing transmission by using the control channel.

With reference to the fourth aspect, or the first, the second, the third, the fourth, the fifth, the sixth, the seventh, or the eighth possible implementation of the fourth aspect, in a ninth possible implementation of the fourth aspect, a time interval between a time at which one UE sends uplink data and a time at which the UE receives a same control channel is different from that in the case of another UE.

It may be learned from the foregoing technical solutions that the embodiments of the present disclosure have the following advantages:

According to the embodiments of the present disclosure, the base station receives the a set of uplink data separately sent by the plurality of UEs. The base station determines the feedback information for the uplink data sent by each of the plurality of UEs, where the feedback information indicates an ACK or a NACK. The base station transmits, by using the control channel, the set of feedback information corresponding to the uplink data sent by the plurality of UEs. In the embodiments of the present disclosure, the base station may separately determine the set of of feedback information for the set of received uplink data. After determining the set of feedback information, the base station may simultaneously transmit the setof feedback information by using only one control channel. The plurality of UEs only need to obtain the feedback information of the UEs from the control channel. Therefore, in the embodiments of the present disclosure, the base station may simultaneously transmit the set of feedback information by using only one control channel, so that system resource overheads are relatively low, and system resource usage is high. This may be well applicable to sending feedback information to UE in a coverage enhancement scenario.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a schematic block flowchart of another feedback information transmission method according to an embodiment of the present disclosure;

FIG. 4-a is a schematic structural diagram of composition of a base station according to an embodiment of the present disclosure;

FIG. 4-*b* is a schematic structural diagram of composition of a sending module according to an embodiment of the present disclosure;

FIG. 5-*a* is a schematic structural diagram of composition of UE according to an embodiment of the present disclosure;

FIG. 5-*b* is a schematic structural diagram of composition of a determining module according to an embodiment of the present disclosure;

DETAILED DESCRIPTION OF ILLUSTRATIVE EMBODIMENTS

Figure 1:
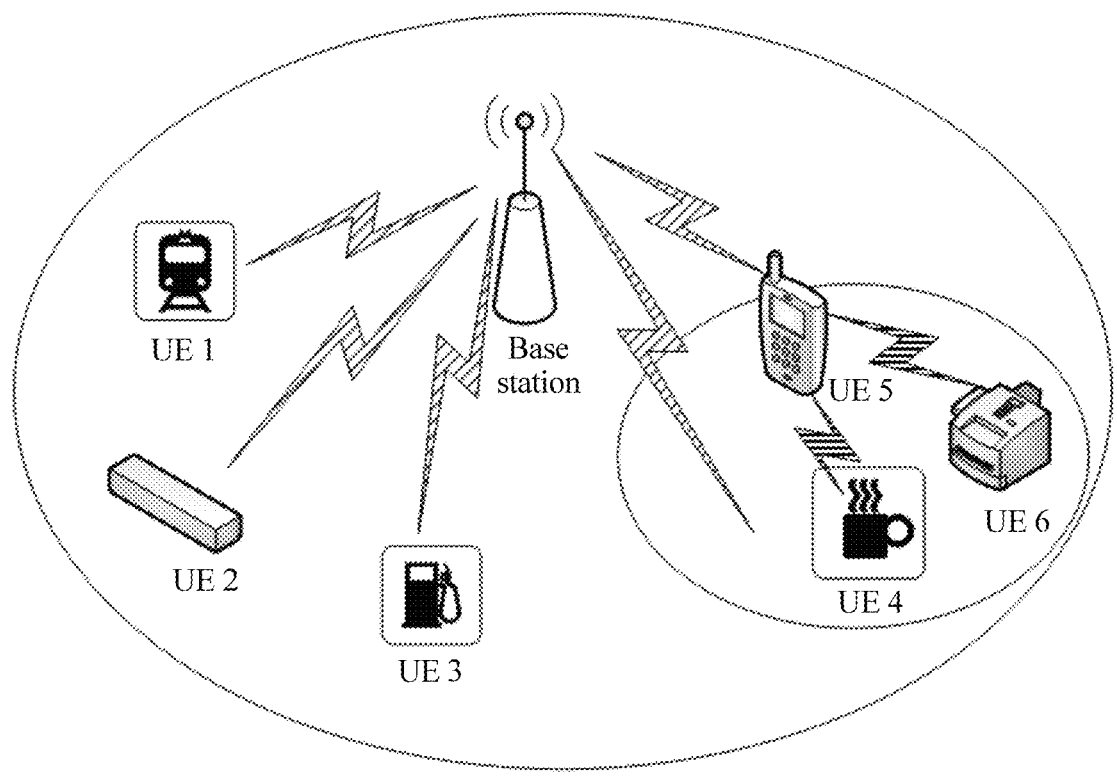
FIG. 1 is a system architecture diagram in which a feedback information transmission method is applied to a communications system according to the present disclosure.

Embodiments of the present disclosure provide a feedback information transmission method, a base station, and user equipment, so as to improve resource usage.

To make the disclosure objectives, features, and advantages of the present disclosure clearer and more comprehensible, the following describes the technical solutions in the embodiments of the present disclosure with reference to the accompanying drawings in the embodiments of the present disclosure. Apparently, the embodiments described in the following are merely a part rather than all of the embodiments of the present disclosure. All other embodiments obtained by a person skilled in the art based on the embodiments of the present disclosure shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present disclosure. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, system, product, or device.

A system architecture to which a feedback information transmission method in the present disclosure is applied is first briefly introduced. The present disclosure is mainly applied to an LTE system or a Long Term Evolution Advanced (LTE-A) system. The present disclosure may also be applied to another communications system, for example, a Wideband Code Division Multiple Access (WCDMA) system or a Time Division-Synchronous Code Division Multiple Access (TD-SCDMA) system, provided that an entity in the communications system can send information, and another entity in the communications system can receive the information.

In the embodiments of the present disclosure, transmission may be sending or receiving. If transmission of a device on one side is sending, transmission of a communications device on another side corresponding to the device on the side is receiving. If transmission of a device on one side is receiving, transmission of a communications device on another side corresponding to the device on the side is sending. Coverage enhancement in the embodiments of the present disclosure may be one or more of repeated transmission, spread spectrum transmission, retransmission, time interval bundling transmission, narrowband (such as subcarrier scheduling) transmission, ultra-narrowband (such as a narrowband with a bandwidth of tens of hertz to ten-odd kilohertz) transmission, power spectrum density boosting transmission, relaxed-requirement transmission, or continuous-attempt transmission. A terminal with low costs or a terminal with low complexity indicates that an operating bandwidth of the terminal device is less than an operating bandwidth of a terminal without low costs or a terminal without low complexity. The operating bandwidth may be one or more of a processing bandwidth, a radio frequency processing bandwidth, or a baseband processing bandwidth. For example, the operating bandwidth is 1.4 MHz (or 200 KHz, or 180 KHz). A narrowband is a frequency resource with a specific frequency width. The narrowband may include one or more subcarriers (such as a subcarrier with a size of 15 KHz, or 2.5 KHz, or 3.75 KHz), or may include one or more resource blocks. A size of the narrowband may be an operating bandwidth.

A control channel in the present disclosure is a channel that carries control information. Feedback information may also be considered as a type of control information. For example, the control channel may be a physical downlink control channel, an enhanced physical downlink control channel, a physical downlink control channel used for machine type communication, or any other channel that can carry control information.

Referring to FIG. 1, FIG. 1 is a system architecture diagram in which a feedback information transmission method is applied to a communications system according to the present disclosure. As shown in FIG. 1, a base station and user equipments (UE) 1 to 6 are included in a communications system. In the communications system, the base station sends one or more of system information, an RAR message, or a paging message to one or more of the UEs 1 to 6. The base station is a transmit end device in the information transmission method in the present disclosure. The UEs 1 to 6 are receive end devices in the information transmission method in the present disclosure. In addition, the UEs 4 to 6 is also included in a communications system. In the communications system, the UE 5 may be implemented as a function of the base station. The UE 5 may send one or more of the system information, the RAR message, or the paging message to the UE 4 or the UE 6 or the UE 4 and the UE 6.

Details are separately described below.

Figure 2:
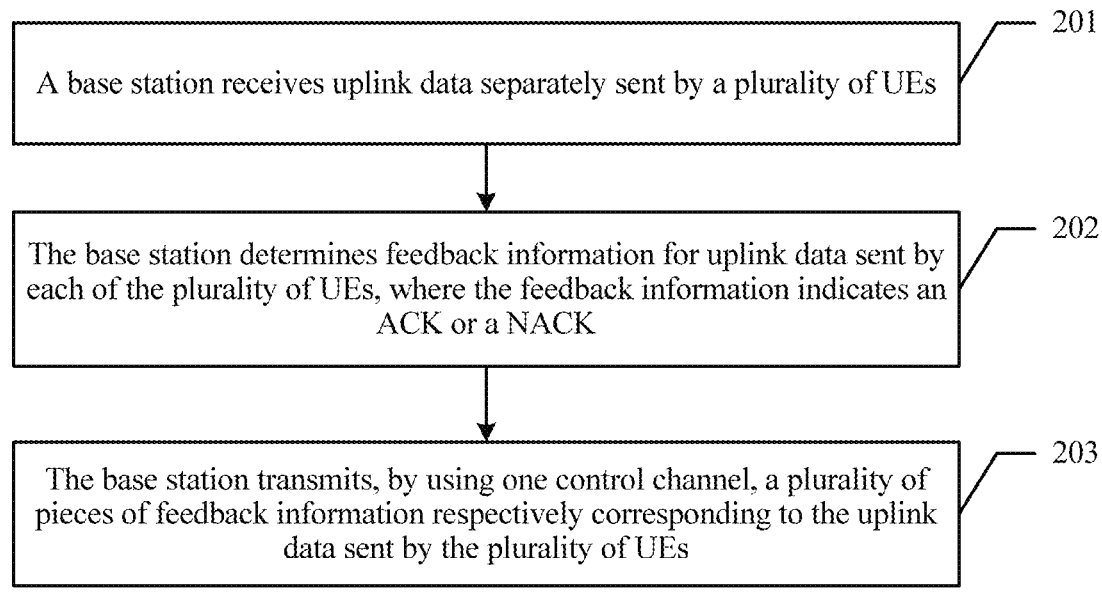
FIG. 2 is a schematic block flowchart of a feedback information transmission method according to an embodiment of the present disclosure.

An embodiment of a feedback information transmission method in the present disclosure may be applied to a scenario in which a base station sends feedback information to UE. Referring to FIG. 2, the feedback information transmission method may include the following steps.

201. The base station receives uplink data separately sent by a plurality of UEs.

In this embodiment of the present disclosure, one base station simultaneously provides a service for a plurality of UEs. A quantity of UEs may be specifically represented by a letter N, where N is a natural number greater than or equal to 1. Each UE may send uplink data to the base station by using uplink channel resources of the UE. For example, the UE sends the uplink data to the base station by using a PUSCH.

202. The base station determines feedback information for uplink data sent by each of the plurality of UEs, where the feedback information indicates an ACK or a NACK.

In this embodiment of the present disclosure, the plurality of UEs separately send the uplink data to the base station. The base station may receive the uplink data sent by each UE. When receiving the uplink data sent by each UE, the base station may correctly receive uplink data of some UEs, or may fail to correctly receive uplink data of some UEs. When receiving the uplink data sent by each UE, the base station needs to determine feedback information for each received uplink data. The feedback information may indicate an ACK, or may indicate a NACK, which is specifically determined according to whether the base station correctly receives the uplink data sent by the UE. For example, if three UEs respectively send uplink data 1, uplink data 2, and uplink data 3 to the base station, the base station may separately receive the uplink data of the three UEs. The base station determines feedback information for each received uplink data. If the base station correctly receives the uplink data 1 and the uplink data 2, but the base station does not correctly receive the uplink data 3, the base station may determine that feedback information 1 indicates an ACK, the base station may determine that feedback information 2 indicates an ACK, and the base station may determine that feedback information 3 indicates a NACK.

It should be noted that, in this embodiment of the present disclosure, after the base station determines feedback information, the base station does not immediately send the feedback information, but continues to determine, according to a receiving status of other uplink data, feedback information corresponding to the other uplink data. After determining the feedback information corresponding to the uplink data sent by each UE, the base station performs step 203.

203. The base station transmits, by using one control channel, a set of feedback information corresponding to the uplink data sent by the plurality of UEs.

In this embodiment of the present disclosure, after the base station determines the feedback information for each uplink data in step 202, the base station transmits, by using the control channel, the set of feedback information corresponding to the uplink data sent by the plurality of UEs. That is, the base station can send the set of feedback information to the plurality of UEs using only one control channel. Each UE can obtain, by using the control channel, feedback information sent by the base station to the UE. After obtaining the feedback information, the UE determines, according to an ACK or a NACK indicated by the feedback information, whether the base station correctly receives uplink data sent by the UE, so that the UE can determine whether the uplink data needs to be sent again.

In some embodiments of the present disclosure, step 203 that the base station transmits, by using one control channel, a set of feedback information corresponding to the uplink data sent by the plurality of UEs includes the following steps.

A1. The base station determines a mode of each UE, where the mode of each UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status.

A2. When determining that the mode of the UE is a first mode, the base station transmits the feedback information by using a first downlink control information format; or when determining that the mode of the UE is a second mode, the base station transmits the feedback information by using a second downlink control information format, where the first mode is different from the second mode, and the first downlink control information format is different from the second downlink control information format.

The base station first determines the mode of each of the plurality of UEs. Specifically, the base station determines that the mode of the UE is one or more of the coverage enhancement level, the repetition level, the repetition quantity, the coverage enhancement, the downlink measurement level, the bundling transmission level, a resource set, or the level information that reflects a channel status. The mode may be at least one piece of the following information: the coverage enhancement level, the repetition level, the repetition quantity, the coverage enhancement, the downlink measurement level, the bundling transmission level, the resource level, or the level information that reflects a channel status. Examples of specific implementation cases are not listed one by one. In a coverage enhancement scenario, the coverage enhancement level, the repetition level, the repetition quantity, the coverage enhancement, the downlink measurement level, the bundling transmission level, the resource level, and the level information that reflects a channel status may all use meanings represented by information in an existing protocol standard. For example, the downlink measurement level is one or more of a reference signal received power level, a path loss level, a reference signal received quality level, a particular signal detection level, or a particular channel detection level. It should be noted that the mode of the UE may include at least one piece of the following information: the coverage enhancement level, the repetition level, the repetition quantity, the repetition quantity level, the coverage enhancement degree, the downlink measurement level, the bundling transmission level, the resource set, or the level information that reflects a channel status. The mode may be specifically the first mode or the second mode. The first mode is different from the second mode. The first mode and the second mode may be implemented in a plurality of manners, provided that the first mode is different from the second mode. For example, when the mode of the UE is the coverage enhancement level, the first mode and the second mode may be represented as two different coverage enhancement levels.

After the base station determines the mode of each UE in step A1, the base station may use different downlink control information formats according to different specific mode levels of modes of the UE. For example, if a coverage enhancement level of the UE is higher than or equal to a predetermined mode level, the base station determines that the mode of the UE is the first mode; or if a coverage enhancement level of the UE is lower than a predetermined mode level, the base station determines that the mode of the UE is the second mode. Therefore, the base station may use different downlink control information formats for the first mode and the second mode of the UE. The first downlink control information format and the second downlink control information format are used to represent different formats.

In some embodiments of the present disclosure, that the first downlink control information format is different from the second downlink control information format includes the following implementation: the first downlink control information format includes a downlink control information format of feedback information used to feed back one or more uplink data of one UE; and the second downlink control information format includes a downlink control information format of feedback information used to simultaneously feed back uplink data of a plurality of UEs.

In this embodiment of the present disclosure, the first downlink control information format and the second downlink control information format may further include another implementation. For example, the first downlink control information format includes a downlink control information format of feedback information used to simultaneously feed back uplink data of a plurality of UEs, and the second downlink control information format includes a downlink control information format of feedback information used to feed back one or more uplink data of one UE.

In this embodiment of the present disclosure, the base station may determine, according to the determined mode of the UE, a method for feeding back an ACK or a NACK to the UE by the base station. If the base station determines that the mode of the UE is the first mode, it is determined that the base station feeds back an ACK or a NACK to the UE by using the first downlink control information format (also referred to as a first transmission method); or if the base station determines that the mode of the UE is the second mode, it is determined that the base station feeds back an ACK or a NACK to the UE by using the second downlink control information format (also referred to as a second transmission method). A repetition level in the first mode may be different from that in the second mode. For example, the repetition level in the first mode is higher than that in the second mode. Alternatively, a repetition quantity in the first mode is greater than that in the second mode.

Specifically, in some embodiments of the present disclosure, step A1 that the base station determines a mode of each UE includes: determining, by the base station, the mode of the UE according to coverage enhancement information of the UE; or autonomously determining, by the base station, the mode of the UE, and notifying the UE of the determined mode of the UE by using signaling.

In some embodiments of the present disclosure, the base station may determine the mode of the UE according to the coverage enhancement information of the UE. When all the UEs have different coverage enhancement information, determined modes of the UEs may be different. The coverage enhancement information may be one or more of repeated transmission, spread spectrum transmission, retransmission, time interval bundling transmission, narrowband (such as subcarrier scheduling) transmission, ultra-narrowband (such as a narrowband with a bandwidth of tens of hertz to ten-odd kilohertz) transmission, power spectrum density boosting transmission, relaxed-requirement transmission, or continuous-attempt transmission. When the base station can determine the mode of the UE according to the coverage enhancement information of the UE, each of the plurality of UEs may determine a mode of the UE according to coverage enhancement information of the UE. In other embodiments of the present disclosure, the base station may further autonomously determine the mode of the UE. The base station may determine the mode of the UE in a self-defined manner or by means of autonomous calculation. Then, the base station notifies the UE of the determined mode of the UE by using signaling. In this way, the UE may determine the mode of the UE by using the signaling sent by the base station. The signaling may be implemented in a plurality of manners. For example, the base station uses known higher layer signaling for notification, or the base station uses self-defined signaling for notification. A specific implementation may be flexibly selected.

The following example is used for description. For example, the control channel is an M-PDCCH. There may be two methods for feeding back an ACK or a NACK. A first transmission method is to use a first DCI format for scheduling data. The first DCI format for scheduling data may carry an ACK feedback or a NACK feedback performed on one or more uplink data of one UE. A second transmission method is to use a second DCI format for simultaneously performing an ACK feedback or a NACK feedback on uplink data of a plurality of UEs, or use a second DCI format for simultaneously performing an ACK feedback or a NACK feedback on uplink data of a plurality of UEs and multiple uplink data of one UE.

For example, when the UE has a requirement for relatively large coverage enhancement (that is, a high level or a large repetition quantity), the first transmission method may be selected to perform an ACK feedback or a NACK feedback, and only a response: an ACK or a NACK is fed back (that is, a feedback of one state), because in case of the requirement for large coverage enhancement, an M-PDCCH required for feeding back an ACK or a NACK needs to be repeatedly sent a relatively large quantity of times, and if the M-PDCCH supports feedbacks of two states: an ACK and a NACK, more system resources are consumed.

If the UE has a requirement for relatively small coverage enhancement, the second transmission method may be selected for use, because in case of the requirement for relatively small coverage enhancement, an M-PDCCH is less repeatedly sent, and fewer resources are consumed for sending one M-PDCCH. In addition, if most UEs have a requirement for relatively small coverage enhancement, one DCI carries ACK/NACK feedbacks for a plurality of UEs, so that system resources can be saved.

When ACK/NACK feedbacks for a plurality of UEs are transmitted by using one M-PDCCH, a coverage enhancement degree of the M-PDCCH, for example, a quantity of repeated sending times may need to be determined according to a requirement of UE with a requirement for maximum coverage enhancement, so that all related UEs can receive the M-PDCCH. With a requirement for relatively small coverage enhancement, because of a large quantity of users, it is relatively easy for a base station side to add, to DCI of one M-PDCCH for transmission, ACK/NACK feedbacks for a plurality of UEs with similar requirements for coverage enhancement. For example, a requirement of UE 1 for coverage enhancement requires the M-PDCCH to be repeatedly transmitted five times, a requirement of UE 2 for coverage enhancement requires the M-PDCCH to be repeatedly transmitted 10 times, and a requirement of UE 3 for coverage enhancement requires the M-PDCCH to be transmitted 20 times. If the UE 1 and the UE 2 are considered as UEs with a requirement for relatively small coverage enhancement, and the UE 3 is considered as UE with a requirement for relatively large coverage enhancement, ACK/NACK feedbacks from the base station to the UE 1 and the UE 2 may be transmitted on one M-PDCCH. However, ACK/NACK feedbacks from the base station to the UE 1 and the UE 3 are not sent on one M-PDCCH. There is a large difference between a repetition quantity of the UE 1 and a repetition quantity of the UE 3. If the ACK/NACK feedbacks for the UE 1 and the UE 3 are sent on one M-PDCCH, the M-PDCCH needs to be repeatedly sent 20 times according to a requirement of the UE 3. In this way, many transmission resources are wasted for a plurality of transmissions of ACK/NACK feedbacks for the UE 1.

It may be learned, from the foregoing example description, that different ACK/NACK transmission methods are selected according to different modes of the UE, thereby effectively using system resources. For a requirement for relatively large coverage enhancement, a status feedback mechanism is used, so as to reduce resources occupied by ACK/NACK feedbacks. For a requirement for relatively small coverage enhancement, ACKs/NACKs are fed back to a plurality of UEs by using an M-PDCCH. Therefore, the UE can clearly know whether transmitted uplink data is correctly received by the base station, so that erroneous determining of the UE is reduced.

In some embodiments of the present disclosure, a quantity of feedback information included in the control channel is determined in the following manner: configuring, by using radio resource control signaling or media access control signaling, the quantity of feedback information included in the control channel; or indicating, by using a field in downlink control information transmitted on the control channel, the quantity of feedback information included in the control channel; or determining, by means of predetermination, the quantity of feedback information included in downlink control information transmitted on the control channel.

The quantity of feedback information included in the control channel is represented by N, and N indicates that feedback information may be sent to N UEs by using one control channel. That is, the base station may separately send the feedback information to the N UEs by using one control channel. The feedback information may indicate an ACK or a NACK. Specifically, in some embodiments of the present disclosure, before sending the control channel, the base station may send, to the UE, the quantity of feedback information included in the control channel. For example, the base station may configure, by using the radio resource control signaling or the media access control signaling, the quantity of feedback information included in the control channel. The quantity of feedback information may be carried in the radio resource control signaling or the media access control signaling. This manner is a half-static manner of configuring the quantity of feedback information. The following example is used for description. A feasible manner is to configure a parameter n by using higher layer signaling. When ACKs/NACKs of a plurality of UEs are transmitted by using an M-PDCCH, the M-PDCCH includes ACK/NACK feedbacks for n UEs. Another feasible manner is to configure a parameter m for a group of UEs. The group of UEs indicates that ACKs/NACKs of the UEs in the group are transmitted in DCI of one M-PDCCH. For example, ACKs/NACKs of m UEs are included in DCI, of an M-PDCCH, for performing an acknowledgement on UE in the group.

In addition, the base station may indicate the quantity of feedback information by using the downlink control information transmitted on the control channel. Specifically, the base station configures a field in the downlink control information. The field may carry the quantity of feedback information. The UE may detect a specific field in the downlink control information, to determine the quantity of feedback information included in the control channel. This manner is a dynamic manner of configuring the quantity of feedback information. For example, DCI of an M-PDCCH includes a field. The field indicates how many UEs whose ACK/NACK feedbacks are included in the M-PDCCH. In addition, the base station may determine the quantity of feedback information by means of predetermination, and the UE may determine the quantity of feedback information according to the predetermination.

Further, in some embodiments of the present disclosure, the downlink control information of the control channel includes M bits, the quantity of feedback information is N, feedback information is indicated by using one bit, feedback information is repeatedly transmitted floor(M/N) times in the downlink control information, floor indicates rounding down to the nearest integer, and both M and N are positive integers. M may be determined according to configuration of the downlink control information. A value of N may be determined according to the quantity of feedback information described above. If feedback information is transmitted floor(M/N) times, and M−N×floor(M/N) is not equal to 0, remaining M−N×floor(M/N) bits may be idle bits or trailing bits. In addition, in some embodiments of the present disclosure, N bits may be further encoded into M bits in an encoding mode. Then, the M encoded bits are included in DCI for transmission. There may be a plurality of implementations for encoding the N bits into the M bits. For details, refer to an encoding mode in the prior art.

In some embodiments of the present disclosure, the base station further needs to determine a specific location that is of feedback information corresponding to each of the plurality of UEs and that is in the downlink control information carried on the control channel. For example, one UE determines a location that is of an ACK feedback or a NACK feedback sent by the base station to the UE and that is in DCI carried on an M-PDCCH. For example, a size of the DCI of the M-PDCCH is 20 bits (bit). According to configuration or predetermination, ACK/NACK feedbacks for six UEs are simultaneously supported in DCI of one M-PDCCH. The following describes in detail how UE knows a specific location corresponding to feedback information that is an ACK feedback or a NACK feedback sent by the base station to the UE. Any one of the plurality of UEs is first UE. A location that is of feedback information sent by the base station to the first UE and that is in the downlink control information carried on the control channel is determined in the following manner: determining, by the base station according to at least one piece of the following information, the location that is of the feedback information sent to the first UE and that is in the downlink control information, where the following information includes an identifier of the first UE, information about resources used by the first UE to send uplink data, a transmission parameter of the control channel, or the quantity of feedback information carried on the control channel; or determining, by the base station according to a sequence index that is of a media access control random access response (Media Access Control Random Access Response, MAC RAR for short) sent to the first UE and that is in an RAR message, the location that is of the feedback information of the first UE and that is in the downlink control information; or autonomously determining, by the base station, the location that is of the feedback information of the first UE and that is in the downlink control information, and adding, to an RAR message sent to the first UE, the location that is of the feedback information of the first UE and that is in the downlink control information.

In this embodiment of the present disclosure, an example in which the base station determines, for the first UE, a location that is in the downlink control information and that is of feedback information corresponding to the first UE is used for description. In addition, the first UE may represent any one of the plurality of UEs. Therefore, according to the foregoing description, each UE can determine a specific location that is of feedback information sent by the base station to the UE and that is in the downlink control information carried on the control channel. A feasible manner is as follows: The base station may calculate, by using information associated with the first UE, the location that is of the feedback information corresponding to the first UE and that is in the downlink control information. For example, the base station determines, according to at least one piece of the following information, the location that is of the feedback information sent to the first UE and that is in the downlink control information, where the following information includes the identifier of the first UE, the information about resources used by the first UE to send uplink data, the transmission parameter of the control channel, or the quantity of feedback information carried on the control channel. The identifier of the first UE may be specifically one or more of a radio network temporary identifier, an international mobile subscriber identity, an international mobile equipment identity, or the like. The resources used by the first UE to send a PUSCH may be one or more of time resources, frequency resources, reference signal resources, sub-band resources, a frequency hopping pattern, a start physical resource block, a start subframe, or an end subframe. The transmission parameter of the control channel may be one or more of an index of a start control channel element, an index of an end control channel element, a start physical resource block, a candidate index, time resources, frequency resources, reference signal resources, sub-band resources, a frequency hopping pattern, a start subframe, or an end subframe. The quantity of feedback information carried on the control channel may be specifically a configured quantity of ACKs/NACKs simultaneously carried in DCI of one M-PDCCH. The base station needs to send an ACK feedback or a NACK feedback to the first UE on a determined location in the foregoing manners. It should be understood that the foregoing manners are only some optional manners.

For another example, the base station may configure the location that is of the feedback information and that is in the downlink control information. The base station performs a configuration that ACK/NACK feedbacks for a group of UEs are combined into DCI of one M-PDCCH for transmission. In addition, the base station configures, for each UE, a bit location that is in DCI and that is of an ACK feedback or a NACK feedback for the UE. For example, the base station configures six UEs as a group, configures, as a first bit in the DCI of the M-PDCCH, a bit location of an ACK feedback or a NACK feedback for the UE 1, and configures, as a second bit in the DCI of the M-PDCCH, a bit location of an ACK feedback or a NACK feedback for the UE 2, and so on. It should be noted that the base station configures, in the foregoing manner, the location that is of the feedback information and that is in the downlink control information. Therefore, the base station needs to send the M-PDCCH according to the configuration. Correspondingly, a UE side may obtain, from a determined bit location in the foregoing configuration manner of the base station, an ACK feedback or a NACK feedback sent by the base station to the UE.

In other embodiments of the present disclosure, a location that is of an ACK feedback or a NACK feedback sent by the base station to the first UE and that is in DCI is determined in the following manner: The base station implicitly obtains, according to a sequence index that is of a MAC RAR sent to the first UE and that is in an RAR message, the location that is of the ACK/NACK feedback sent by the base station to the first UE and that is in the DCI. For example, the sequence index that is of the MAC RAR of the UE and that is in the RAR message is a location index that is of the ACK/NACK feedback sent by the base station to the first UE and that is in the DCI. One RAR message may include a plurality of MAC RARs. The first UE determines the MAC RAR of the first UE according to a preamble identifier in an RAR. In addition, the first UE needs to receive a complete RAR message. Therefore, the first UE may determine a sequence number that is of the MAC RAR sent by the base station to the first UE and that is in the RAR message, and further determine, according to the sequence number, a sequence number that is of the ACK/NACK feedback sent by the base station to the first UE and that is in the DCI.

In other embodiments of the present disclosure, the base station autonomously determines the location that is of the feedback information of the first UE and that is in the downlink control information. Then, the base station sends, by using the RAR message, the location that is autonomously determined for the first UE, that is of the feedback information, and that is in the downlink control information. Information about the location that is of the ACK/NACK feedback sent by the base station to the first UE and that is in the DCI is indicated in the RAR message.

In some embodiments of the present disclosure, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process. That is, in one HARQ process, the base station may transmit, on a same location in the downlink control information, feedback information corresponding to initially transmitted uplink data and feedback information corresponding to retransmitted uplink data. In this way, the UE can determine, from the location, feedback information of initially transmitted uplink data and feedback information of retransmitted uplink data that are sent by the base station to the UE. For example, a location that is of an ACK feedback or a NACK feedback sent by the base station to UE and that is in the DCI may be corresponding to a HARQ process. In this way, for PUSCHs in a same HARQ process, that is, for both an initially transmitted PUSCH and a retransmitted PUSCH, ACK/NACK feedbacks corresponding to uplink data in the same HARQ process are on a same location in the DCI.

In some embodiments of the present disclosure, when the base station transmits the set of feedback information by using the control channel, narrowband resources used by the control channel may be configured in a plurality of manners. The UE needs to receive the control channel according to the narrowband resources. Specifically, the narrowband resources used for performing transmission by using the control channel are determined in the following manner: adding, by the base station, indication information of the narrowband resources to an RAR message sent to UE; or determining, by the base station by means of preconfiguration according to an identifier of UE or an identifier of a group in which UE is located, the narrowband resources used for performing transmission by using the control channel.

The base station may add the indication information of the narrowband resources to the RAR message. For example, an RAR message indicates a location of narrowband resources used for performing transmission by using an M-PDCCH. A location of narrowband resources used for performing transmission by using an M-PDCCH is notified in an RAR message. The M-PDCCH includes ACK/NACK feedbacks transmitted on PUSCHs corresponding to all MAC RARs in the RAR message. The base station may alternatively determine the narrowband resources by means of preconfiguration. The base station determines, according to the identifier of the UE or the identifier of the group in which the UE is located, the narrowband resources used for performing transmission by using the control channel. For example, the base station determines, by means of preconfiguration according to the identifier of the group in which the UE is located, the location of the narrowband resources used for performing transmission by using the M-PDCCH. The identifier of the group may be configured by the base station, or may be determined by means of predetermination. A preconfiguration manner may be a modulo operation or another formula operation. The UE and the base station determine, by means of preconfiguration according to the identifier of the UE or the identifier of the group, the location of the narrowband resources used for performing transmission by using the M-PDCCH.

In some embodiments of the present disclosure, a time interval between a time at which one UE sends uplink data and a time at which the UE receives a same control channel is different from that in the case of another UE. The following example is used for description. There is a known time sequence relationship between a data channel and an ACK feedback or a NACK feedback for the data channel. For example, ACK/NACK feedback starts to be transmitted after n subframes after transmission of a PUSCH ends. If ACKs/NACKs fed back by the base station to a plurality of UEs are included in DCI of one M-PDCCH for transmission, a time sequence relationship needs to be changed. For example, a PUSCH of the UE 1 is repeatedly transmitted r1 times, and a PUSCH of the UE 2 is repeatedly transmitted r2 times. A subframe m1 is defined as a subframe in which the UE 1 starts to transmit the PUSCH, and a subframe m2 is defined as a subframe in which the UE 2 starts to transmit the PUSCH. If the base station always starts to send an ACK response or a NACK response to the UE 1 after k1 subframes after transmission of the PUSCH ends, and the base station always starts to send an ACK response or a NACK response to the UE 2 after k2 subframes after transmission of the PUSCH ends, for the UE 1, the base station starts to send an ACK feedback or a NACK feedback to the UE 1 in a subframe (m1+r1+k1), and for the UE 2, the base station starts to send an ACK feedback or a NACK feedback to the UE 2 in a subframe (m2+r2+k2). If m1+r1+k1 is not equal to m2+r2+k2, the base station cannot multiplex, in DCI of one M-PDCCH for transmission, ACK/NACK feedbacks for the two UEs. To multiplex, in DCI of one M-PDCCH for transmission, the ACK/NACK feedbacks for the two UEs, the base station needs to modify timing of the ACK/NACK feedbacks, so that m1+r1+k1 is equal to m2+r2+k2. Therefore, for ACK/NACK feedbacks for PUSCHs of different UEs, timing between the PUSCHs and the ACK/NACK feedbacks is different for the different UEs. For example, the base station starts to feed back an ACK or a NACK to the UE 1 at a specific moment, and starts to feed back an ACK or a NACK to the UE 2 at a specific moment. The specific moment may be predetermined in a standard.

In some embodiments of the present disclosure, the downlink control information in the control channel is used to transmit the feedback information, or the downlink control information is used to schedule uplink data or downlink data. Different scrambling codes are used to distinguish between downlink control information used to transmit feedback information and downlink control information used to schedule uplink data or downlink data. Specifically, a scrambling code is a random access radio network temporary identifier (RA-RNTI for short); or a scrambling code is preconfigured; or a scrambling code is obtained by modifying an RA-RNTI; or a scrambling code is notified by the base station to the UE by using the RAR message.

For example, if a size of DCI that is of an M-PDCCH and that carries a plurality of ACKs/NACKs is the same as a size of DCI that is of an M-PDCCH and that is used to schedule other downlink data or uplink data, the UE determines, by using a scrambling code, whether the M-PDCCH carries DCI used to transmit a plurality of ACKs/NACKs or DCI used to schedule uplink or downlink data. A feasible manner is to define a special scrambling code. For example, the special scrambling code may be a specific radio network temporary identifier RNTI (RNTI for short), such as an acknowledgement-RNTI, an M-PDCCH scrambled by using the special RNTI is the M-PDCCH that carries the plurality of ACKs/NACKs. Another feasible manner is to define a scrambling code for a group of UEs. The scrambling code may be configured by the base station or determined by UE in the group. An M-PDCCH scrambled by using the scrambling code is used to carry an ACK feedback or a NACK feedback for the UE in the group. In particular, the scrambling code may be determined in the following manner:

1. The scrambling code is an RA-RNTI. It is indicated, by using an explicit bit (such as a bit of DCI) or in an implicit manner (for example, further by using a scrambling sequence or different M-PDCCH transmission resources), whether the M-PDCCH carries DCI used to transmit a plurality of ACK/NACK feedbacks or DCI used to schedule uplink or downlink data.

2. A new scrambling code is defined.

For example, a new scrambling code is defined in respect of a dimension of a preamble on the basis of an RA-RNTI, a scrambling code is fixedly specified in a system, or a modified code is added to an RA-RNTI to generate a new scrambling code. The modified code may be configured by using a system information block (SIB) or an RAR.

3. A scrambling code is notified in an RAR message. The scrambling code used for transmission of PUSCHs (for example, a message 3) corresponding to all MAC RARs in the RAR message is the same.

According to the foregoing description of this embodiment of the present disclosure, the base station receives the uplink data separately sent by the plurality of UEs. The base station determines the feedback information for the uplink data sent by each of the plurality of UEs, where the feedback information indicates an ACK or a NACK. The base station transmits, by using the control channel, the set of feedback information corresponding to the uplink data sent by the plurality of UEs. In this embodiment of the present disclosure, the base station may separately determine the feedback information of the set of feedback information for each received uplink data. After determining the set of feedback information for one time, the base station may simultaneously transmit the set of feedback information by using only one control channel. The plurality of UEs only need to obtain the feedback information of the UEs from the control channel. Therefore, in this embodiment of the present disclosure, the base station may simultaneously transmit the set of feedback information by using only one control channel, so that system resource overheads are relatively low, and system resource usage is high. This may be well applicable to sending feedback information to UE in a coverage enhancement scenario.

The feedback information transmission method is described in the foregoing embodiment from the perspective of a base station side. A feedback information transmission method provided in the present disclosure is described below from the perspective of a peer end side (user equipment) of a base station. Referring to FIG. 3, the feedback information transmission method provided in another embodiment of the present disclosure may include the following steps.

301. The UE sends uplink data to the base station.

In this embodiment of the present disclosure, a plurality of UEs may send uplink data to the base station. One of the UEs is used below as an example to describe a feedback information obtaining method implemented on the basis of a UE side. The UE may send the uplink data to the base station by using uplink channel resources. For example, the UE sends the uplink data to the base station by using a PUSCH.

302. The UE determines, by using a control channel, feedback information sent by the base station to the UE, where the feedback information indicates an ACK or a NACK, and a set of feedback information corresponding to uplink data sent by a plurality of UEs are transmitted on the control channel.

In this embodiment of the present disclosure, after the UE sends the uplink data to the base station, the base station may receive the uplink data sent by the UE. When receiving the uplink data sent by the UE, the base station may correctly receive the uplink data of the UE, or may fail to correctly receive the uplink data of the UE. When receiving uplink data sent by each UE, the base station needs to determine feedback information for each respective uplink data. The feedback information may indicate an ACK, or may indicate a NACK, which is specifically determined according to whether the base station correctly receives the uplink data sent by the UE.

In this embodiment of the present disclosure, after the base station determines the feedback information for each uplink data, the base station transmits, by using the control channel, the set of feedback information corresponding to the uplink data sent by the plurality of UEs. That is, the base station can send the set of feedback information to the plurality of UEs by using only one control channel. Each UE can obtain, by using the control channel, feedback information sent by the base station to the UE. After obtaining the feedback information, the UE determines, according to an ACK or a NACK indicated by the feedback information, whether the base station correctly receives uplink data sent by the UE, so that the UE can determine whether the uplink data needs to be sent again.

In some embodiments of the present disclosure, step 302 that the UE obtains, by using a control channel, feedback information sent by the base station to the UE includes the following steps.

B1. The UE determines a mode of the UE, where the mode of the UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status.

B2. When determining that the mode of the UE is a first mode, the UE receives, by using a first downlink control information format, the feedback information sent by the base station; or when determining that the mode of the UE is a second mode, the UE receives, by using a second downlink control information format, the feedback information sent by the base station, where the first mode is different from the second mode, and the first downlink control information format is different from the second downlink control information format.

The UE first determines the mode of the UE. Specifically, the UE determines that the mode of the UE is one or more of the coverage enhancement level, the repetition level, the repetition quantity, the coverage enhancement, the downlink measurement level, the bundling transmission level, a resource level, or the level information that reflects a channel status. The mode may be at least one piece of the following information: the coverage enhancement level, the repetition level, the repetition quantity, the coverage enhancement, the downlink measurement level, the bundling transmission level, the resource level, or the level information that reflects a channel status. Examples of specific implementation cases are not listed one by one. In a coverage enhancement scenario, the coverage enhancement level, the repetition level, the repetition quantity, the coverage enhancement, the downlink measurement level, the bundling transmission level, the resource level, and the level information that reflects a channel status may all use meanings represented by information in an existing protocol standard. For example, the downlink measurement level is one or more of a reference signal received power level, a path loss level, a reference signal received quality level, a particular signal detection level, or a particular channel detection level. It should be noted that the mode of the UE may include at least one piece of the following information: the coverage enhancement level, the repetition level, the repetition quantity, the repetition quantity level, the coverage enhancement degree, the downlink measurement level, the bundling transmission level, the resource set, or the level information that reflects a channel status. The mode may be specifically the first mode or the second mode. The first mode is different from the second mode. The first mode and the second mode may be implemented in a plurality of manners, provided that the first mode is different from the second mode. For example, when the mode of the UE is the coverage enhancement level, the first mode and the second mode may be represented as two different coverage enhancement levels.

After the UE determines the mode of the UE in step B1, the UE may receive the control channel by using different downlink control information formats according to different specific mode levels of the mode of the UE. For example, if a coverage enhancement level of the UE is higher than or equal to a predetermined mode level, the UE determines that the mode of the UE is the first mode; or if a coverage enhancement level of the UE is lower than a predetermined mode level, the UE determines that the mode of the UE is the second mode. Therefore, the UE may use different downlink control information formats for the first mode and the second mode of the UE. The first downlink control information format and the second downlink control information format are used to represent different formats.

In some embodiments of the present disclosure, that the first downlink control information format is different from the second downlink control information format includes the following implementation: the first downlink control information format includes a downlink control information format of feedback information used to feed back one or more uplink data of one UE; and the second downlink control information format includes a downlink control information format of feedback information used to simultaneously feed back uplink data of a plurality of UEs.

In this embodiment of the present disclosure, the first downlink control information format and the second downlink control information format may further include another implementation. For example, the first downlink control information format includes a downlink control information format of feedback information used to simultaneously feed back uplink data of a plurality of UEs, and the second downlink control information format includes a downlink control information format of feedback information used to feed back one or more uplink data of one UE.

Specifically, in some embodiments of the present disclosure, step B1 that the UE determines a mode of the UE includes: determining, by the UE, the mode of the UE according to coverage enhancement information of the UE; or determining, by the UE, the mode of the UE by receiving signaling sent by the base station.

In some embodiments of the present disclosure, the UE may determine the mode of the UE according to the coverage enhancement information of the UE. When all the UEs have different coverage enhancement information, determined modes of the UEs may be different. The coverage enhancement information may be one or more of repeated transmission, spread spectrum transmission, retransmission, time interval bundling transmission, narrowband (such as subcarrier scheduling) transmission, ultra-narrowband (such as a narrowband with a bandwidth of tens of hertz to ten-odd kilohertz) transmission, power spectrum density boosting transmission, relaxed-requirement transmission, or continuous-attempt transmission. When the UE can determine the mode of the UE according to the coverage enhancement information of the UE, each of the plurality of UEs may determine a mode of the UE according to coverage enhancement information of the UE. In other embodiments of the present disclosure, the base station may further autonomously determine the mode of the UE. The base station may determine the mode of the UE in a self-defined manner or by means of autonomous calculation. Then, the base station notifies the UE of the determined mode of the UE by using signaling. In this way, the UE may determine the mode of the UE by receiving the signaling sent by the base station. The signaling may be implemented in a plurality of manners. For example, the base station uses higher layer signaling for notification, or the base station uses self-defined signaling for notification. A specific implementation may be flexibly selected.

In some embodiments of the present disclosure, a quantity of feedback information included in the control channel is determined in the following manner: receiving radio resource control signaling or media access control signaling, where the radio resource control signaling or the media access control signaling is used to configure the quantity of feedback information included in the control channel; or receiving downlink control information transmitted on the control channel, where a field in the downlink control information is used to indicate the quantity of feedback information included in the control channel; or determining, by means of predetermination, the quantity of feedback information included in downlink control information transmitted on the control channel.

The quantity of feedback information included in the control channel is represented by N, and N indicates that feedback information may be sent to N UEs by using one control channel. That is, the base station may separately send the feedback information to the N UEs by using one control channel. The feedback information may indicate an ACK or a NACK. Specifically, in some embodiments of the present disclosure, before sending the control channel, the base station may send, to the UE, the quantity of feedback information included in the control channel. The UE obtains the quantity of feedback information by receiving the signaling sent by the base station. For example, the base station may configure, by using the radio resource control signaling or the media access control signaling, the quantity of feedback information included in the control channel. The quantity of feedback information may be carried in the radio resource control signaling or the media access control signaling. This manner is a half-static manner of configuring the quantity of feedback information. The UE may determine, by receiving the radio resource control signaling or the media access control signaling, the quantity of feedback information included in the control channel.

In addition, the base station may indicate the quantity of feedback information by using the downlink control information transmitted on the control channel. Specifically, the base station configures a field in the downlink control information. The field may carry the quantity of feedback information. The UE may detect a specific field in the downlink control information, to determine the quantity of feedback information included in the control channel. This manner is a dynamic manner of configuring the quantity of feedback information. The UE may determine, by receiving the downlink control information, the quantity of feedback information included in the control channel.

Further, in some embodiments of the present disclosure, the downlink control information of the control channel includes M bits, the quantity of feedback information is N, each feedback information of the set of feedback information is indicated by using one bit, each feedback information is repeatedly transmitted floor(M/N) times in the downlink control information, floor indicates rounding down to the nearest integer, and both M and N are positive integers. M may be determined according to configuration of the downlink control information or a format of the downlink control information. A value of N may be determined according to the quantity of feedback information described above. If each feedback information is transmitted floor(M/N) times, and M−N×floor(M/N) is not equal to 0, remaining M−N× floor(M/N) bits may be idle bits or trailing bits. In addition, in some embodiments of the present disclosure, N bits may be further encoded into M bits in an encoding mode. Then, the M encoded bits are included in DCI for transmission. There may be a plurality of implementations for encoding the N bits into the M bits. For details, refer to an encoding mode in the prior art.

In some embodiments of the present disclosure, the UE further needs to determine a specific location that is of feedback information sent by the base station to the UE and that is in the downlink control information carried on the control channel. For example, one UE determines a location that is of an ACK feedback or a NACK feedback sent by the base station to the UE and that is in DCI carried on an M-PDCCH. For example, a size of the DCI of the M-PDCCH is 20 bits (bit). According to configuration or predetermination, ACK/NACK feedbacks for six UEs are simultaneously supported in DCI of one M-PDCCH. The following describes in detail how UE knows a specific location corresponding to feedback information that is an ACK feedback or a NACK feedback sent by the base station to the UE. The UE determines, in the following manner, the location that is of the feedback information and that is in the downlink control information carried on the control channel: determining, by the UE according to at least one piece of the following information, the location that is of the feedback information and that is in the downlink control information, where the following information includes an identifier of the UE, information about resources used by the UE to send uplink data, a transmission parameter of the control channel, or the quantity of feedback information carried on the control channel; or determining, by the UE according to a sequence index that is of a media access control random access response MAC RAR sent by the base station to the UE and that is in an RAR message, the location that is of the feedback information and that is in the downlink control information; or receiving, by the UE, an RAR message sent by the base station to the UE, and obtaining, from the received RAR message, the location that is of the feedback information and that is in the downlink control information.

In this embodiment of the present disclosure, each UE can determine a specific location that is of feedback information sent by the base station to the UE and that is in the downlink control information carried on the control channel. A feasible manner is as follows: The UE may calculate, using information associated with the UE, the location that is of the feedback information corresponding to the UE and that is in the downlink control information. For example, the UE determines, according to at least one piece of the following information, the location that is of the feedback information sent to the UE and that is in the downlink control information, where the following information includes the identifier of the UE, the information about resources used by the UE to send uplink data, the transmission parameter of the control channel, or the quantity of feedback information carried on the control channel. The identifier of the UE may be specifically one or more of a radio network temporary identifier, an international mobile subscriber identity, an international mobile equipment identity, or the like. The resources used by the UE to send a PUSCH may be one or more of time resources, frequency resources, reference signal resources, sub-band resources, a frequency hopping pattern, a start physical resource block, a start subframe, or an end subframe. The transmission parameter of the control channel may be one or more of an index of a start control channel element, an index of an end control channel element, a start physical resource block, a candidate index, time resources, frequency resources, reference signal resources, sub-band resources, a frequency hopping pattern, a start subframe, or an end subframe.

In other embodiments of the present disclosure, a location that is of an ACK feedback or a NACK feedback and that is in DCI is determined in the following manner: The UE implicitly obtains, according to a sequence index that is of a MAC RAR sent by the base station to the UE and that is in an RAR message, the location that is of the ACK/NACK feedback sent by the base station to the UE and that is in the DCI. For example, the sequence index that is of the MAC RAR of the UE and that is in the RAR message is a location index that is of the ACK/NACK feedback sent by the base station to the UE and that is in the DCI. One RAR message may include a plurality of MAC RARs. The UE determines the MAC RAR of the UE according to a preamble identifier in an RAR. In addition, the UE needs to receive a complete RAR message. Therefore, the UE may determine a sequence number that is of the MAC RAR sent by the base station to the UE and that is in the RAR message, and further determine, according to the sequence number, a sequence number that is of the ACK/NACK feedback sent by the base station to the UE and that is in the DCI.

In other embodiments of the present disclosure, the base station autonomously determines the location that is of the feedback information of the UE and that is in the downlink control information. Then, the base station sends, by using the RAR message, the location that is autonomously determined for the UE, that is of the feedback information, and that is in the downlink control information. Information about the location that is of the ACK/NACK feedback sent by the base station to the UE and that is in the DCI is indicated in the RAR message.

In some embodiments of the present disclosure, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process. That is, in one HARQ process, the base station may transmit, on a same location in the downlink control information, feedback information corresponding to initially transmitted uplink data and feedback information corresponding to retransmitted uplink data. In this way, the UE can determine, from the location, feedback information of initially transmitted uplink data and feedback information of retransmitted uplink data that are sent by the base station to the UE.

In some embodiments of the present disclosure, when the base station transmits the set of feedback information by using the control channel, narrowband resources used by the control channel may be configured in a plurality of manners. The UE needs to receive the control channel according to the narrowband resources. Specifically, the narrowband resources used for performing transmission by using the control channel are determined in the following manner: determining, by the UE, the narrowband resources by using indication information that is of the narrowband resources and that is carried in the RAR message sent by the base station to the UE; or determining, by the UE by means of preconfiguration according to the identifier of the UE or an identifier of a group in which the UE is located, the narrowband resources used for performing transmission by using the control channel.

The base station may add the indication information of the narrowband resources to the RAR message. The UE may determine, by receiving the indication information sent by the base station, the narrowband resources allocated by the base station to the UE. For example, an RAR message indicates a location of narrowband resources used for performing transmission by using an M-PDCCH. A location of narrowband resources used for performing transmission by using an M-PDCCH is notified in an RAR message. The M-PDCCH includes ACK/NACK feedbacks transmitted on PUSCHs corresponding to all MAC RARs in the RAR message. A narrowband is a frequency resource with a specific frequency width. The narrowband may include one or more subcarriers (such as a subcarrier with a size of 15 KHz, or 2.5 KHz, or 3.75 KHz), or may include one or more resource blocks. A size of the narrowband may be an operating bandwidth. A control channel in the present disclosure is a channel that carries control information. Feedback information may also be considered as a type of control information. For example, the control channel may be a physical downlink control channel, an enhanced physical downlink control channel, a physical downlink control channel used for machine type communication, or any other channel that can carry control information.

The UE may alternatively determine the narrowband resources by means of preconfiguration. The UE determines, according to the identifier of the UE or the identifier of the group in which the UE is located, the narrowband resources used for performing transmission by using the control channel. For example, the UE determines, by means of preconfiguration according to the identifier of the group in which the UE is located, the location of the narrowband resources used for performing transmission by using the M-PDCCH. The identifier of the group may be configured by the base station, or may be determined by means of predetermination. A preconfiguration manner may be a modulo operation or another formula operation. The UE and the base station determine, by means of preconfiguration according to the identifier of the UE or the identifier of the group, the location of the narrowband resources used for performing transmission by using the M-PDCCH.

In some embodiments of the present disclosure, a time interval between a time at which one UE sends uplink data and a time at which the UE receives a same control channel is different from that in the case of another UE. The following example is used for description. There is a known time sequence relationship between a data channel and an ACK feedback or a NACK feedback for the data channel. For example, ACK/NACK feedback starts to be transmitted after n subframes after transmission of a PUSCH ends. If ACKs/NACKs fed back by the base station to a plurality of UEs are included in DCI of one M-PDCCH for transmission, a time sequence relationship needs to be changed. For example, a PUSCH of UE 1 is repeatedly transmitted r1 times, and a PUSCH of UE 2 is repeatedly transmitted r2 times. A subframe m1 is defined as a subframe in which the UE 1 starts to transmit the PUSCH, and a subframe m2 is defined as a subframe in which the UE 2 starts to transmit the PUSCH. If the base station always starts to send an ACK response or a NACK response to the UE 1 after k1 subframes after transmission of the PUSCH ends, and the base station always starts to send an ACK response or a NACK response to the UE 2 after k2 subframes after transmission of the PUSCH ends, for the UE 1, the base station starts to send an ACK feedback or a NACK feedback to the UE 1 in a subframe (m1+r1+k1), and for the UE 2, the base station starts to send an ACK feedback or a NACK feedback to the UE 2 in a subframe (m2+r2+k2). If m1+r1+k1 is not equal to m2+r2+k2, the base station cannot multiplex, in DCI of one M-PDCCH for transmission, ACK/NACK feedbacks for the two UEs. To multiplex, in DCI of one M-PDCCH for transmission, the ACK/NACK feedbacks for the two UEs, the base station needs to modify timing of the ACK/NACK feedbacks, so that m1+r1+k1 is equal to m2+r2+k2. Therefore, for ACK/NACK feedbacks for PUSCHs of different UEs, timing between the PUSCHs and the ACK/NACK feedbacks is different for the different UEs. For example, the base station starts to feed back an ACK or a NACK to the UE 1 at a specific moment, and starts to feed back an ACK or a NACK to the UE 2 at a specific moment. The specific moment may be predetermined in a standard.

In some embodiments of the present disclosure, the downlink control information in the control channel is used to transmit the feedback information, or the downlink control information is used to schedule uplink data or downlink data. Different scrambling codes are used to distinguish between downlink control information used to transmit feedback information and downlink control information used to schedule uplink data or downlink data. Specifically, a scrambling code is an RA-RNTI; or a scrambling code is preconfigured; or a scrambling code is obtained by modifying an RA-RNTI; or a scrambling code is notified by the base station to the UE by using the RAR message.

For example, if a size of DCI that is of an M-PDCCH and that carries a plurality of ACKs/NACKs is the same as a size of DCI that is of an M-PDCCH and that is used to schedule other downlink data or uplink data, the UE determines, by using a scrambling code, whether the M-PDCCH carries DCI used to transmit a plurality of ACKs/NACKs or DCI used to schedule uplink or downlink data. A feasible manner is to define a special scrambling code. For example, the scrambling code may be an RNTI, such as an A-RNTI, an M-PDCCH scrambled by using the RNTI is the M-PDCCH that carries the plurality of ACKs/NACKs. Another feasible manner is to define a scrambling code for a group of UEs. The scrambling code may be configured by the base station or determined by UE in the group. An M-PDCCH scrambled by using the scrambling code is used to carry an ACK feedback or a NACK feedback for the UE in the group.

According to the foregoing description of this embodiment of the present disclosure, each of the plurality of UEs separately sends the uplink data to the base station. The base station receives the uplink data separately sent by the plurality of UEs. The base station determines the feedback information for the uplink data sent by each of the plurality of UEs, where the feedback information indicates an ACK or a NACK. The base station transmits, by using the control channel, the set of feedback information corresponding to the uplink data sent by the plurality of UEs. In this embodiment of the present disclosure, the UE may determine the feedback information of the UE from the control channel used for simultaneously transmitting the set of feedback information. In this way, the base station may simultaneously transmit the set of feedback information to the plurality of UEs by using only one control channel, so that system resource overheads are relatively low, and system resource usage is high. This may be well applicable to receiving and sending feedback information in a coverage enhancement scenario.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

To better implement the foregoing solutions in the embodiments of the present disclosure, the following further provides a related apparatus used to implement the foregoing solutions.

Referring to FIG. 4-*a*, FIG. 4-*a* shows a base station 400 provided in an embodiment of the present disclosure. The base station 400 may include a receiving module 401, a determining module 402, and a sending module 403.

The receiving module 401 is configured to receive uplink data separately sent by a plurality of user equipments (UEs).

The determining module 402 is configured to determine feedback information for uplink data sent by each of the plurality of UEs, where the feedback information indicates an acknowledgement (ACK) or a negative acknowledgement (NACK).

The sending module 403 is configured to transmit, by using one control channel, a set of feedback information corresponding to the uplink data sent by the plurality of UEs.

In some embodiments of the present disclosure, as shown in FIG. 4-*b*, the sending module 403 includes a mode determining submodule 4031 and a transmission submodule 4032.

The mode determining submodule 4031 is configured to determine a mode of each UE, where the mode of each UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status.

The transmission submodule 4032 is configured to: when it is determined that the mode of the UE is a first mode, transmit the feedback information by using a first downlink control information format; or when it is determined that the mode of the UE is a second mode, transmit the feedback information by using a second downlink control information format, where the first mode is different from the second mode, and the first downlink control information format is different from the second downlink control information format.

In some embodiments of the present disclosure, that the first downlink control information format is different from the second downlink control information format includes: the first downlink control information format includes a downlink control information format of the feedback information used to feed back one or more uplink data of one UE; and the second downlink control information format includes a downlink control information format of the feedback information used to simultaneously feed back uplink data of a plurality of UEs.

In some embodiments of the present disclosure, the determining submodule 402 is specifically configured to: determine the mode of the UE according to coverage enhancement information of the UE; or autonomously determine the mode of the UE, and notify the UE of the determined mode of the UE by using signaling.

In some embodiments of the present disclosure, the determining module 402 is further configured to determine, in the following manner, a quantity of feedback information included in the control channel: configuring, by using radio resource control signaling or media access control signaling, the quantity of feedback information included in the control channel; or indicating, by using a field in downlink control information transmitted on the control channel, the quantity of feedback information included in the control channel; or determining, by means of predetermination, the quantity of feedback information included in downlink control information transmitted on the control channel.

In some embodiments of the present disclosure, the downlink control information of the control channel includes M bits, the quantity of feedback information is N, each feedback information of the set of feedback information is indicated by using one bit, each feedback information is repeatedly transmitted floor(M/N) times in the downlink control information, floor indicates rounding down to the nearest integer, and both M and N are positive integers.

In some embodiments of the present disclosure, any one of the plurality of UEs is first UE, and the determining module is further configured to determine, in the following manner, a location that is of feedback information sent to the first UE and that is in the downlink control information carried on the control channel: determining, according to at least one piece of the following information, the location that is of the feedback information sent to the first UE and that is in the downlink control information, where the following information includes an identifier of the first UE, information about resources used by the first UE to send uplink data, a transmission parameter of the control channel, or the quantity of feedback information carried on the control channel; or determining, according to a sequence index that is of a media access control random access response MAC RAR sent to the first UE and that is in an RAR message, the location that is of the feedback information of the first UE and that is in the downlink control information; or autonomously determining the location that is of the feedback information of the first UE and that is in the downlink control information, and adding, to an RAR message sent to the first UE, the location that is of the feedback information of the first UE and that is in the downlink control information.

In some embodiments of the present disclosure, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process.

In some embodiments of the present disclosure, the determining module 402 is further configured to determine, in the following manner, narrowband resources used for performing transmission by using the control channel: adding indication information of the narrowband resources to a random access response RAR message sent to UE; or determining, by means of preconfiguration according to an identifier of UE or an identifier of a group in which UE is located, the narrowband resources used for performing transmission by using the control channel.

In some embodiments of the present disclosure, a time interval between a time at which one UE sends uplink data and a time at which the UE receives a same control channel is different from that in the case of another UE.

According to the foregoing description of this embodiment of the present disclosure, the base station receives the uplink data separately sent by the plurality of UEs. The base station determines the feedback information for the uplink data sent by each of the plurality of UEs, where the feedback information indicates an ACK or a NACK. The base station transmits, by using the control channel, the set of feedback information corresponding to the uplink data sent by the plurality of UEs. In this embodiment of the present disclosure, the base station may separately determine the set of feedback information for the received uplink data. After determining the set of feedback information for one time, the base station may simultaneously transmit the set of feedback information by using only one control channel. The plurality of UEs only need to obtain the feedback information of the UEs from the control channel. Therefore, in this embodiment of the present disclosure, the base station may simultaneously transmit the set of feedback information by using only one control channel, so that system resource overheads are relatively low, and system resource usage is high. This may be well applicable to sending feedback information to UE in a coverage enhancement scenario.

Referring to FIG. 5-a, FIG. 5-a shows a UE 500 provided in an embodiment of the present disclosure. The UE 500 may include a sending module 501 and a determining module 502.

The sending module 501 is configured to send uplink data to a base station.

The determining module 502 is configured to determine, by using a control channel, feedback information sent by the base station to the UE, where the feedback information indicates an acknowledgement (ACK) or a negative acknowledgement (NACK), and a set of feedback information corresponding to uplink data sent by a plurality of UEs are transmitted on the control channel.

In some embodiments of the present disclosure, as shown in FIG. 5-b, the determining module 502 includes a mode determining submodule 5021 and a transmission submodule 5022.

The mode determining submodule 5021 is configured to determine a mode of the UE, where the mode of the UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status.

The transmission submodule 5022 is configured to: when it is determined that the mode of the UE is a first mode, receive, by using a first downlink control information format, the feedback information sent by the base station; or when it is determined that the mode of the UE is a second mode, receive, by using a second downlink control information format, the feedback information sent by the base station, where the first mode is different from the second mode, and the first downlink control information format is different from the second downlink control information format.

In some embodiments of the present disclosure, that the first downlink control information format is different from the second downlink control information format includes: the first downlink control information format includes a downlink control information format of the feedback information used to feed back one or more uplink data of one UE; and the second downlink control information format includes a downlink control information format of the feedback information used to simultaneously feed back uplink data of a plurality of UEs.

In some embodiments of the present disclosure, the mode determining submodule 5021 is specifically configured to: determine the mode of the UE according to coverage enhancement information of the UE; or determine the mode of the UE by receiving signaling sent by the base station.

In some embodiments of the present disclosure, the determining module 502 is further configured to determine, in the following manner, a quantity of feedback information included in the control channel: receiving radio resource control signaling or media access control signaling, where the downlink control information is used to configure the quantity of feedback information included in the control channel; or receiving downlink control information transmitted on the control channel, where a field in the downlink control information is used to indicate the quantity of feedback information included in the control channel; or determining, by means of predetermination, the quantity of feedback information included in downlink control information transmitted on the control channel.

In some embodiments of the present disclosure, the downlink control information of the control channel includes M bits, the quantity of feedback information is N, each feedback information of the set of feedback information is indicated by using one bit, each feedback information is repeatedly transmitted floor(M/N) times in the downlink control information, floor indicates rounding down to the nearest integer, and both M and N are positive integers.

In some embodiments of the present disclosure, the determining module 502 is further configured to determine, in the following manner, a location that is of the feedback information and that is in the downlink control information carried on the control channel: determining, according to at least one piece of the following information, the location that is of the feedback information and that is in the downlink control information, where the following information includes an identifier of the UE, information about resources used by the UE to send uplink data, a transmission parameter of the control channel, or the quantity of feedback information carried on the control channel; or determining, according to a sequence index that is of a media access control random access response MAC RAR sent by the base station to the UE and that is in an RAR message, the location that is of the feedback information and that is in the downlink control information; or receiving an RAR message sent by the base station to the UE, and obtaining, from the received RAR message, the location that is of the feedback information and that is in the downlink control information.

In some embodiments of the present disclosure, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process.

In some embodiments of the present disclosure, the determining module 502 is further configured to determine, in the following manner, narrowband resources used for performing transmission by using the control channel: determining the narrowband resources by using indication information that is of the narrowband resources and that is carried in the RAR message sent by the base station to the UE; or determining, by means of preconfiguration according to the identifier of the UE or an identifier of a group in which the UE is located, the narrowband resources used for performing transmission by using the control channel.

In some embodiments of the present disclosure, a time interval between a time at which one UE sends uplink data and a time at which the UE receives a same control channel is different from that in the case of another UE.

According to the foregoing description of this embodiment of the present disclosure, each of the plurality of UEs separately sends the uplink data to the base station. The base station receives the uplink data separately sent by the plurality of UEs. The base station determines the feedback information for the uplink data sent by each of the plurality of UEs, where the feedback information indicates an ACK or a NACK. The base station transmits, by using the control channel, the set of feedback information respectively corresponding to the uplink data sent by the plurality of UEs. In this embodiment of the present disclosure, the UE may determine the feedback information of the UE from the control channel used for simultaneously transmitting the set of feedback information. In this way, the base station may simultaneously transmit the set of feedback information to the plurality of UEs by using only one control channel, so that system resource overheads are relatively low, and system resource usage is high. This may be well applicable to receiving and sending feedback information in a coverage enhancement scenario.

It should be noted that content such as information exchange between the modules/units of the apparatus and the execution processes thereof is based on the same idea as that of the method embodiments of the present disclosure, and produces the same technical effects as those of the method embodiments of the present disclosure. For the specific content, refer to the description in the preceding method embodiments of the present disclosure, and details are not described herein again.

An embodiment of the present disclosure further provides a computer storage medium. The computer storage medium stores a program, and the program performs some or all of the steps described in the foregoing method embodiments.

Figure 6:
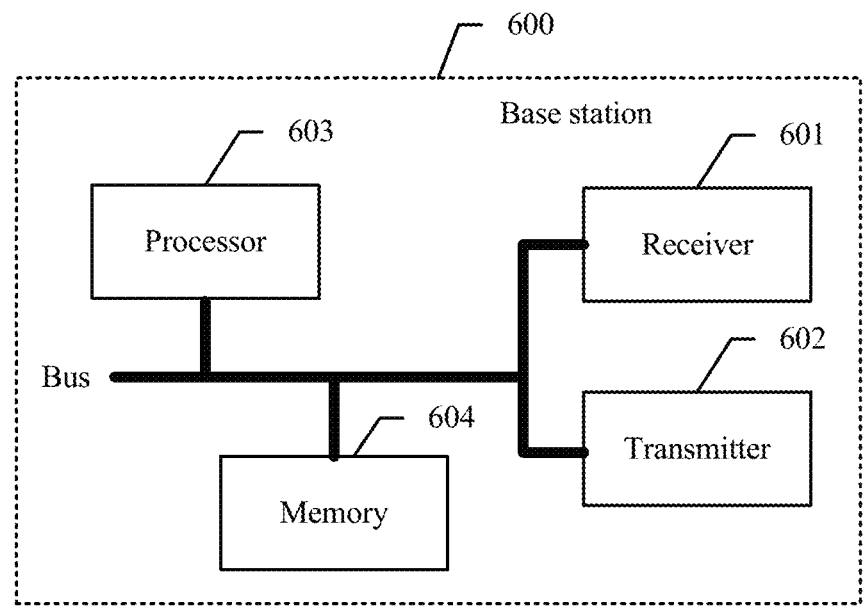
FIG. 6 is a schematic structural diagram of composition of another base station according to an embodiment of the present disclosure.

The following describes another base station provided in an embodiment of the present disclosure. As shown in FIG. 6, the base station 600 includes: a receiver 601, a transmitter 602, a processor 603, and a memory 604 (there may be one or more processors 603 in the base station 600, and one processor is used as an example in FIG. 6). In some embodiments of the present disclosure, the receiver 601, the transmitter 602, the processor 603, and the memory 604 may be connected by using a bus or in another manner, and an example in which a connection is implemented by using a bus is used in FIG. 6.

The processor 603 is configured to perform the following steps: receiving uplink data separately sent by a plurality of user equipments (UEs); determining feedback information for uplink data sent by each of the plurality of UEs, where the feedback information indicates an acknowledgement (ACK) or a negative acknowledgement (NACK); and transmitting, by using one control channel, a set of feedback information corresponding to the uplink data sent by the plurality of UEs.

In some embodiments of the present disclosure, the processor 603 is specifically configured to perform the following steps: determining a mode of each UE, where the mode of each UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status; and when determining that the mode of the UE is a first mode, transmitting the feedback information by using a first downlink control information format; or when determining that the mode of the UE is a second mode, transmitting the feedback information by using a second downlink control information format, where the first mode is different from the second mode, and the first downlink control information format is different from the second downlink control information format.

In some embodiments of the present disclosure, that the first downlink control information format is different from the second downlink control information format includes: the first downlink control information format includes a downlink control information format of the feedback information used to feed back one or more uplink data of one UE; and the second downlink control information format includes a downlink control information format of the feedback information used to simultaneously feed back uplink data of a plurality of UEs.

In some embodiments of the present disclosure, the processor 603 is further configured to perform the following step: determining the mode of the UE according to coverage enhancement information of the UE; or autonomously determining the mode of the UE, and notifying the UE of the determined mode of the UE by using signaling.

In some embodiments of the present disclosure, a quantity of feedback information included in the control channel is determined in the following manner: configuring, by using radio resource control signaling or media access control signaling, the quantity of feedback information included in the control channel; or indicating, by using a field in downlink control information transmitted on the control channel, the quantity of feedback information included in the control channel; or determining, by means of predetermination, the quantity of feedback information included in downlink control information transmitted on the control channel.

In some embodiments of the present disclosure, the downlink control information of the control channel includes M bits, the quantity of feedback information is N, each feedback information of the set of feedback information is indicated by using one bit, each feedback information is repeatedly transmitted floor(M/N) times in the downlink control information, floor indicates rounding down to the nearest integer, and both M and N are positive integers.

In some embodiments of the present disclosure, any one of the plurality of UEs is first UE. The processor 603 is specifically configured to perform the following step: determining, according to at least one piece of the following information, a location that is of feedback information sent to the first UE and that is in the downlink control information, where the following information includes an identifier of the first UE, information about resources used by the first UE to send uplink data, a transmission parameter of the control channel, or the quantity of feedback information carried on the control channel; or determining, according to a sequence index that is of a media access control random access response MAC RAR sent to the first UE and that is in an RAR message, a location that is of feedback information of the first UE and that is in the downlink control information; or autonomously determining a location that is of feedback information of the first UE and that is in the downlink control information, and adding, to an RAR message sent to the first UE, the location that is of the feedback information of the first UE and that is in the downlink control information.

In some embodiments of the present disclosure, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process.

In some embodiments of the present disclosure, narrowband resources used for performing transmission by using the control channel are determined in the following manner: adding indication information of the narrowband resources to a random access response RAR message sent to UE; or determining, by means of preconfiguration according to an identifier of UE or an identifier of a group in which UE is located, the narrowband resources used for performing transmission by using the control channel.

In some embodiments of the present disclosure, a time interval between a time at which one UE sends uplink data and a time at which the UE receives a same control channel is different from that in the case of another UE.

According to the foregoing description of this embodiment of the present disclosure, the base station receives the uplink data separately sent by the plurality of UEs. The base station determines the feedback information for the uplink data sent by each of the plurality of UEs, where the feedback information indicates an ACK or a NACK. The base station transmits, by using the control channel, the set of feedback information corresponding to the uplink data sent by the plurality of UEs. In this embodiment of the present disclosure, the base station may separately determine the set of feedback information for the plurality of received uplink data. After determining the set of feedback information for one time, the base station may simultaneously transmit the set of feedback information by using only one control channel. The plurality of UEs only need to obtain the feedback information of the UEs from the control channel. Therefore, in this embodiment of the present disclosure, the base station may simultaneously transmit the set of feedback information by using only one control channel, so that system resource overheads are relatively low, and system resource usage is high. This may be well applicable to sending feedback information to UE in a coverage enhancement scenario.

Figure 7:
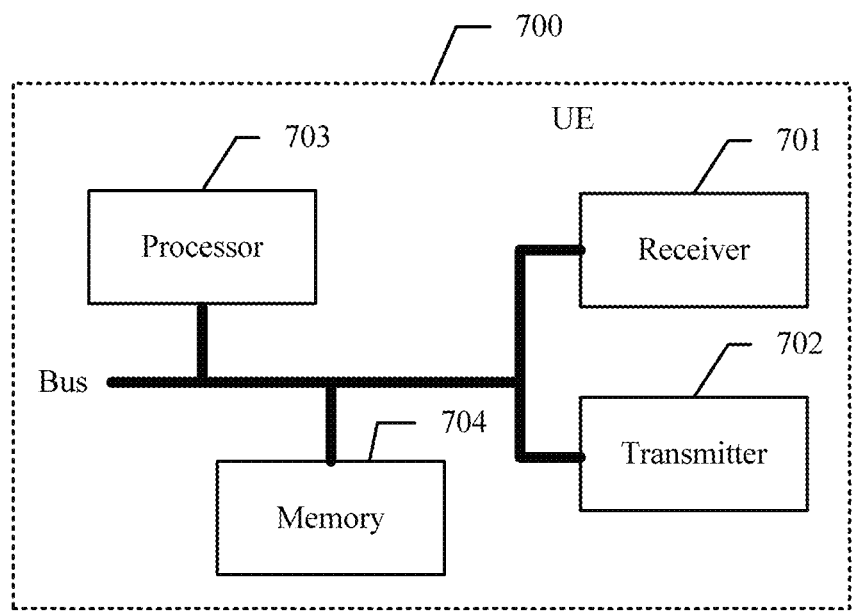
FIG. 7 is a schematic structural diagram of composition of another UE according to an embodiment of the present disclosure.

The following describes another UE provided in an embodiment of the present disclosure. As shown in FIG. 7, the UE 700 includes: a receiver 701, a transmitter 702, a processor 703, and a memory 704 (there may be one or more processors 703 in the UE 700, and one processor is used as an example in FIG. 7). In some embodiments of the present disclosure, the receiver 701, the transmitter 702, the processor 703, and the memory 704 may be connected by using a bus or in another manner, and an example in which a connection is implemented by using a bus is used in FIG. 7.

The processor 703 is configured to perform the following steps: sending uplink data to a base station; and determining, by using a control channel, feedback information sent by the base station to the UE, where the feedback information indicates an acknowledgement (ACK) or a negative acknowledgement (NACK), and a set of feedback information respectively corresponding to uplink data sent by a plurality of UEs are transmitted on the control channel.

In some embodiments of the present disclosure, the processor 703 is specifically configured to perform the following steps: determining a mode of the UE, where the mode of the UE includes at least one piece of the following information: a coverage enhancement level, a repetition level, a repetition quantity, a repetition quantity level, a coverage enhancement degree, a downlink measurement level, a bundling transmission level, a resource set, or level information that reflects a channel status; and when determining that the mode of the UE is a first mode, receiving, by using a first downlink control information format, the feedback information sent by the base station; or when determining that the mode of the UE is a second mode, receiving, by using a second downlink control information format, the feedback information sent by the base station, where the first mode is different from the second mode, and the first downlink control information format is different from the second downlink control information format.

In some embodiments of the present disclosure, that the first downlink control information format is different from the second downlink control information format includes: the first downlink control information format includes a downlink control information format of the feedback information used to feed back one or more uplink data of one UE; and the second downlink control information format includes a downlink control information format of the feedback information used to simultaneously feed back uplink data of a plurality of UEs.

In some embodiments of the present disclosure, the processor 703 is further configured to perform the following step: determining, by the UE, the mode of the UE according to coverage enhancement information of the UE; or determining, by the UE, the mode of the UE by receiving signaling sent by the base station.

In some embodiments of the present disclosure, the processor 703 is further configured to perform the following step: receiving radio resource control signaling or media access control signaling, where the radio resource control signaling or the media access control signaling is used to configure the quantity of feedback information included in the control channel; or receiving downlink control information transmitted on the control channel, where a field in the downlink control information is used to indicate the quantity of feedback information included in the control channel; or determining, by means of predetermination, the quantity of feedback information included in downlink control information transmitted on the control channel.

In some embodiments of the present disclosure, the downlink control information of the control channel includes M bits, the quantity of feedback information is N, each feedback information of the set of feedback information is indicated by using one bit, each feedback information is repeatedly transmitted floor(M/N) times in the downlink control information, floor indicates rounding down to the nearest integer, and both M and N are positive integers.

In some embodiments of the present disclosure, the processor 703 is further configured to perform the following step: determining, according to at least one piece of the following information, a location that is of the feedback information and that is in the downlink control information, where the following information includes an identifier of the UE, information about resources used by the UE to send uplink data, a transmission parameter of the control channel, or the quantity of feedback information carried on the control channel; or determining, according to a sequence index that is of a media access control random access response MAC RAR sent by the base station to the UE and that is in an RAR message, a location that is of the feedback information and that is in the downlink control information; or receiving an RAR message sent by the base station to the UE, and obtaining, from the received RAR message, the location that is of the feedback information and that is in the downlink control information.

In some embodiments of the present disclosure, a location that is in the downlink control information and that is of feedback information corresponding to initially transmitted uplink data corresponding to a hybrid automatic repeat request HARQ process is the same as a location that is in the downlink control information and that is of feedback information corresponding to retransmitted uplink data corresponding to the HARQ process.

In some embodiments of the present disclosure, the processor 703 is further configured to perform the following step: determining narrowband resources by using indication information that is of the narrowband resources and that is carried in the RAR message sent by the base station to the UE; or determining, by means of preconfiguration according to the identifier of the UE or an identifier of a group in which the UE is located, narrowband resources used for performing transmission by using the control channel.

In some embodiments of the present disclosure, a time interval between a time at which one UE sends uplink data and a time at which the UE receives a same control channel is different from that in the case of another UE.

According to the foregoing description of this embodiment of the present disclosure, each of the plurality of UEs separately sends the uplink data to the base station. The base station receives the uplink data separately sent by the plurality of UEs. The base station determines the feedback information for the uplink data sent by each of the plurality of UEs, where the feedback information indicates an ACK or a NACK. The base station transmits, by using the control channel, the set of feedback information respectively corresponding to the uplink data sent by the plurality of UEs. In this embodiment of the present disclosure, the UE may determine the feedback information of the UE from the control channel used for simultaneously transmitting the set of feedback information. In this way, the base station may simultaneously transmit the set of feedback information to the plurality of UEs by using only one control channel, so that system resource overheads are relatively low, and system resource usage is high. This may be well applicable to receiving and sending feedback information in a coverage enhancement scenario.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be specifically implemented as one or more communications buses or signal cables. A person of ordinary skill in the art may understand and implement the embodiments of the present disclosure without creative efforts.

Based on the description of the foregoing implementations, a person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation in most cases. Based on such an understanding, the technical solutions of the present disclosure essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present disclosure.

In conclusion, the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method, comprising:
sending, by a first user equipment (UE), first uplink data to a base station; and
determining, by the first UE, first feedback information, wherein the first feedback information is sent by the base station to the first UE using a control channel, the first feedback information indicates an acknowledgement (ACK) or a negative acknowledgement (NACK), a set of feedback information corresponding to a set of uplink data sent by a plurality of UEs is transmitted on the control channel, each UE of the plurality of UEs separately sends uplink data of the set of uplink data, the set of uplink data includes the first uplink data, the set of feedback information includes the first feedback information, and the plurality of UEs includes the first UE, wherein a quantity of feedback information of the set of feedback information transmitted on the control channel is determined by:
receiving radio resource control signaling or media access control signaling, wherein the radio resource control signaling or the media access control signaling is used to configure the quantity of feedback information of the set of feedback information transmitted on the control channel;
receiving downlink control information transmitted on the control channel, wherein a field in the downlink control information indicates the quantity of feedback information of the set of feedback information transmitted on the control channel; or
determining, using predetermination, the quantity of feedback information of the set of feedback information comprised in the downlink control information transmitted on the control channel; and
wherein the downlink control information of the control channel comprises M bits, the quantity of feedback information of the set of feedback information is N, each piece of feedback information of the set of feedback information is indicated by using one bit, each piece of feedback information of the set of feedback information is repeatedly transmitted floor(M/N) times in the downlink control information, floor indicates rounding down to a nearest integer, and both M and N are positive integers.

2. The method according to claim 1, wherein determining the first feedback information comprises:
determining, by the first UE, a mode of the first UE, wherein the mode of the first UE comprises: a coverage enhancement level, a repetition level, a repetition quantity, a repetition quantity level, a coverage enhancement degree, a downlink measurement level, a bundling transmission level, a resource set, or level information that reflects a channel status;
when the determined mode of the first UE is a first mode, receiving, by the first UE using a first downlink control information format, the first feedback information sent by the base station; and
when the determined mode of the first UE is a second mode, receiving, by the first UE using a second downlink control information format, the first feedback information sent by the base station, wherein the first mode is different from the second mode, and the first downlink control information format is different from the second downlink control information format.

3. The method according to claim 2, wherein the first downlink control information format being different from the second downlink control information format comprises:
the first downlink control information format comprising a downlink control information format of the feedback information of the set of feedback information corresponding to uplink data of one UE; and
the second downlink control information format comprising a downlink control information format of the feedback information of the set of feedback information corresponding to uplink data of multiple UEs.

4. The method according to claim 2, wherein determining, by the first UE, the mode of the first UE, comprises:
determining, by the first UE, the mode of the first UE according to coverage enhancement information of the first UE; or
determining, by the first UE, the mode of the first UE by receiving signaling sent by the base station.

5. A base station, comprising:
a receiver, configured to receive a set of uplink data from a plurality of user equipment (UEs), wherein each UE of the plurality of UEs separately sends uplink data of the set of uplink data to the base station;

a processor;

a non-transitory computer-readable storage medium coupled to the processor and storing programming instructions for execution by the processor, wherein the programming instructions instruct the processor to:
determine a set of feedback information for the set of uplink data, wherein each feedback information of the set of feedback information indicates an acknowledgement (ACK) or a negative acknowledgement (NACK) for respective uplink data of the set of uplink data; and
determine a quantity of feedback information of the set of feedback information comprised in one control channel by:
configuring, using radio resource control signaling or media access control signaling, the quantity of feedback information of the set of feedback information comprised in the control channel;
indicating, using a field in downlink control information transmitted on the control channel, the quantity of feedback information of the set of feedback information comprised in the control channel; or
determining, by predetermination, the quantity of feedback information of the set of feedback information comprised in the downlink control information transmitted on the control channel; and a transmitter, configured to transmit, using the control channel, the set of feedback information corresponding to the set of uplink data sent by the plurality of UEs, wherein the downlink control information of the control channel comprises M bits, the quantity of feedback information of the set of feedback information is N, each piece of feedback information of the set of feedback information is indicated using one bit, each piece of feedback information of the set of feedback information is repeatedly transmitted floor(M/N) times in the downlink control information, floor indicates rounding down to a nearest integer, and both M and N are positive integers.

6. The base station according to claim 5, wherein the transmitter is further configured to:
determine a mode of each UE of the plurality of UEs, wherein the mode of each UE comprises: a coverage enhancement level, a repetition level, a repetition quantity, a repetition quantity level, a coverage enhancement degree, a downlink measurement level, a bundling transmission level, a resource set, or level information that reflects a channel status; and
for each UE of the plurality of UEs, when the mode of the respective UE is a first mode, transmit respective feedback information of the set of feedback information using a first downlink control information format, or when it is determined that the mode of the respective UE is a second mode, transmit the respective feedback information of the set of feedback information using a second downlink control information format, wherein the respective feedback information corresponds to respective uplink data of the set of uplink data sent by the respective UE, wherein the first mode is different from the second mode, and the first downlink control information format is different from the second downlink control information format.

7. The base station according to claim 6, wherein the first downlink control information format being different from the second downlink control information format comprises:
the first downlink control information format comprising a downlink control information format of the feedback information of the set of feedback information corresponding to uplink data of one UE; and
the second downlink control information format comprising a downlink control information format of the feedback information of the set of feedback information corresponding to uplink data of multiple UEs.

8. The base station according to claim 6, wherein the programming instructions further cause the processor to:
for each UE of the plurality of UEs, determine the mode of the respective UE according to coverage enhancement information of the respective UE; or autonomously determine the mode of the respective UE, and notify the respective UE of the determined mode of the respective UE using signaling.

9. The base station according to claim 5, wherein the programming instructions further cause the processor to determine a location of each feedback information of the set of feedback information that is sent to a first UE of the plurality of UEs and that is in the downlink control information carried on the control channel by:
determining the location of each feedback information of the set of feedback information that is sent to the first UE according to: an identifier of the first UE, information about resources used by the first UE to send uplink data of the set of uplink data, a transmission parameter of the control channel, or the quantity of feedback information of the set of feedback information carried on the control channel; or
determining, according to a sequence index that is of a media access control random access response (MAC RAR) sent to the first UE that is in a random access response (RAR) message, the location of each feedback information of the set of feedback information that is sent to the first UE that is in the downlink control information; or
autonomously determining the location of each feedback information of the set of feedback information that is sent to the first UE and that is in the downlink control information, and adding, to the RAR message sent to the first UE, the location of each feedback information of the set of feedback information that is sent to the first UE that is in the downlink control information.

10. A first user equipment (UE), comprising:

a transmitter, configured to send first uplink data to a base station;

a processor; and a non-transitory computer-readable storage medium coupled to the processor and storing programming instructions for execution by the processor, wherein the programming instructions instruct the processor to:
determine, using a control channel, first feedback information, wherein the first feedback information is sent by the base station to the first UE, the first feedback information indicates an acknowledgement (ACK) or a negative acknowledgement (NACK), and a set of feedback information that corresponds to a set of uplink data that is sent by a plurality of UEs is transmitted on the control channel, each UE of the plurality of UEs separately sends uplink data of the set of uplink data, the set of uplink data includes the first uplink data, the set of feedback information includes the first feedback information, and the plurality of UEs includes the first UE; and determine a quantity of feedback information of the set of feedback information comprised in the control channel by:

receiving radio resource control signaling or media access control signaling, wherein downlink control information in the received radio resource control signaling or media access control signaling is used to configure a quantity of the feedback information of the set of feedback information comprised in the control channel; or receiving downlink control information transmitted on the control channel, wherein a field in the downlink control information indicates the quantity of the feedback information of the set of feedback information comprised in the control channel; or determining, by predetermination, the quantity of the feedback information of the set of feedback information comprised in downlink control information transmitted on the control channel; and wherein the downlink control information of the control channel comprises M bits, the quantity of the feedback information of the set of feedback information is N, each piece of feedback information of the set of feedback information is indicated by using one bit, each piece of feedback information of the set of feedback information is repeatedly transmitted floor(M/N) times in the downlink control information, floor indicates rounding down to a nearest integer, and both M and N are positive integers.

11. The first UE according to claim 10, wherein the programming instructions further cause the processor to:

determine a mode of the first UE, wherein the mode of the first UE comprises: a coverage enhancement level, a repetition level, a repetition quantity, a repetition quantity level, a coverage enhancement degree, a downlink measurement level, a bundling transmission level, a resource set, or level information that reflects a channel status;

when the mode of the first UE is a first mode, receive, using a first downlink control information format, the first feedback information sent by the base station; and when the mode of the first UE is a second mode, receive, using a second downlink control information format, the first feedback information sent by the base station, wherein the first mode is different from the second mode, and the first downlink control information format is different from the second downlink control information format.

12. The first UE according to claim 11, wherein the first downlink control information format being different from the second downlink control information format comprises:

the first downlink control information format comprising a downlink control information format of the feedback information of the set of feedback information corresponding to uplink data of one UE; and the second downlink control information format comprising a downlink control information format of the feedback information of the set of feedback information corresponding to uplink data of multiple UEs.

13. The first UE according to claim 11, wherein the programming instructions further cause the processor to:

determine the mode of the first UE according to coverage enhancement information of the first UE; or determine the mode of the first UE by receiving signaling sent by the base station.

14. The first UE according to claim 10, wherein the programming instructions further cause the processor to determine a location of the first feedback information in the downlink control information carried on the control channel by:

determining the location of the first feedback information in the downlink control information according to: an identifier of the first UE, information about resources used by the first UE to send the first uplink data, a transmission parameter of the control channel, or the quantity of the feedback information of the feedback information set carried on the control channel; or determining, according to a sequence index of a media access control random access response (MAC RAR) sent by the base station to the first UE in an RAR message, the location of the first feedback information in the downlink control information; or receiving the RAR message sent by the base station to the first UE, and obtaining, from the received RAR message, the location of the first feedback information in the downlink control information.

* * * * *